(12) United States Patent
Kim et al.

(10) Patent No.: US 12,495,801 B2
(45) Date of Patent: Dec. 16, 2025

(54) BACILLUS SUBTILIS JCK-1398 STRAIN INDUCING RESISTANCE IN VARIOUS PLANTS, AND COMPOSITION AND METHOD FOR CONTROLLING PINE WILT DISEASE BY USING SAME

(71) Applicants: Republic of Korea (National institute of forest science), Seoul (KR); JAN153 BIOTECH INC., Gwangju (KR)

(72) Inventors: Jin-Cheol Kim, Gwangju (KR); Ae Ran Park, Chungcheongnam-do (KR); Hee Won Jeon, Gwangju (KR); Min Jeong Sung, Gwangju (KR); Se-In Jeong, Gwangju (KR); Young-Su Seo, Busan (KR); Nam Gyu Kim, Gyeongsangnam-do (KR); Jun Heon Kim, Gyeonggi-do (KR); Sang-Hyun Lee, Seoul (KR)

(73) Assignees: REPUBLIC OF KOREA (NATIONAL INSTITUTE OF FOREST SCIENCE), Seoul (KR); JAN153 BIOTECH INC., Gwangju (KR)

( * ) Notice: Subject to any disclaimer, the term of this patent is extended or adjusted under 35 U.S.C. 154(b) by 657 days.

(21) Appl. No.: 17/799,340

(22) PCT Filed: Dec. 10, 2020

(86) PCT No.: PCT/KR2020/018113
§ 371 (c)(1),
(2) Date: Nov. 28, 2022

(87) PCT Pub. No.: WO2021/162226
PCT Pub. Date: Aug. 19, 2021

(65) Prior Publication Data
US 2023/0087802 A1  Mar. 23, 2023

(30) Foreign Application Priority Data
Feb. 12, 2020 (KR) ......... 10-2020-0017232

(51) Int. Cl.
*A01N 63/22* (2020.01)
*A01N 43/653* (2006.01)
*A01P 1/00* (2006.01)
*A61K 35/00* (2006.01)
*A61K 35/742* (2015.01)
*A61K 39/07* (2006.01)
*C12N 1/20* (2006.01)
*C12R 1/125* (2006.01)

(52) U.S. Cl.
CPC ........... *A01N 63/22* (2020.01); *A01N 43/653* (2013.01); *A61K 35/742* (2013.01); *A61K 39/07* (2013.01); *C12N 1/20* (2013.01); *A61K 2035/115* (2013.01); *C12R 2001/125* (2021.05)

(58) Field of Classification Search
None
See application file for complete search history.

(56) References Cited

FOREIGN PATENT DOCUMENTS

| KR | 10-2017-0071061 A | 6/2017 |
|---|---|---|
| KR | 10-2019-0022381 A | 3/2019 |
| WO | WO-2013/110591 A1 | 8/2013 |
| WO | WO-2016/128239 A1 | 8/2016 |
| WO | WO-2018/183381 A1 | 10/2018 |

OTHER PUBLICATIONS

Ogunnupebi et al. International J. Agronomy, Article 8840046, 1-18, vol. 2020.*
Chen et al. Chin J Pesticide Sci. 4(4): 40-44, 2002—Condensed Machine Translation, pp. 1-2 only.*
International Search Report from corresponding PCT Application No. PCT/KR2020/018113, dated Mar. 24, 2021.

* cited by examiner

*Primary Examiner* — S. Devi
(74) *Attorney, Agent, or Firm* — Harness, Dickey & Pierce, P.L.C.

(57) ABSTRACT

The present invention relates to a *Bacillus subtilis* JCK-1398 strain (Accession No. KCTC 14084BP) having induced resistance activity in pine trees and various plants, a pesticidal or antibacterial composition comprising same as an active ingredient, a composition for controlling plant diseases or pests, and a control method using same. The *Bacillus subtilis* JCK-1398 strain of the present invention was experimentally confirmed to have control activity against pests, nematodes, and fungi, which cause various plant diseases, by inducing resistance in a host. Thus, the *Bacillus subtilis* JCK-1398 strain of the present invention can be effectively used to control related plant diseases and can be spread over a wide area through foliar spraying, and therefore is expected to be able to prevent the spread of pine wilt disease at low cost.

5 Claims, 19 Drawing Sheets
Specification includes a Sequence Listing.

BACILLUS SUBTILIS JCK-1398 STRAIN INDUCING RESISTANCE IN VARIOUS PLANTS, AND COMPOSITION AND METHOD FOR CONTROLLING PINE WILT DISEASE BY USING SAME

CROSS-REFERENCE TO RELATED APPLICATIONS

This application is a national phase application of PCT Application No. PCT/KR2020/018113, filed on Dec. 10, 2020, which claims priority to Korean Patent Application No. 10-2020-0017232, filed on Feb. 12, 2020. The entire disclosures of the applications identified in this paragraph are incorporated herein by reference.

TECHNICAL FIELD

The present invention was made with the support of the Korean Forest Service under Project No. FE0702-2016-02, which was conducted in the research project entitled "Development and Validation of Environment-Friendly Control Agents Against Pine Wilt Disease Based on Induced Resistance" within the research program named "Service Research Program" by Chonnam National University Industry-Academic Cooperation Foundation under the management of the National Institute of Forest Science, from 19 Apr. 2019 to 29 Nov. 2019.

The present invention relates to a *Bacillus subtilis* JCK-1398 strain inducing resistance in pine trees and various plants and to a composition and a method for controlling plant diseases by using the same.

BACKGROUND ART

Pine wilt disease caused by *Bursaphelenchus xylophilus* is seriously damaging pine trees domestically and abroad and is recently spreading rapidly in a complicated pattern along with changes in the forest ecosystem environment due to climate change.

Pine wilt disease is known to be mainly caused by *Bursaphelenchus xylophilus*, which is a forest pest that defoliates pine trees through complex interactions with hosts, pathogens, vector insects, and environmental factors and is difficult to control, and once infected, almost all pine trees die without being treated.

There are several methods to control this pine wilt disease, but the control by trunk injection is almost the only prevention method. However, abamectin and emamectin benzoate, which are widely used for trunk injection, have a short duration of efficacy of 2 years and a limited period of injection, and Green Guard by Japan is expensive and has limitations in general-purpose application.

Additionally, the trunk injection is problematic in the prevention of pine wilt disease throughout a wide area as well as the price of chemicals and is not effective due to the difficulty in accessing pine forests in high mountainous areas. Moreover, Kuroda and Kenmochi (Pine Wilt Disease Conference, IUFRO, 2016) warned that repeated trunk injection of nematicides to control pine wilt disease causes uninfected pine trees to be rather killed.

Accordingly, there is an urgent need to develop eco-friendly chemicals that can effectively control plant diseases and pests in a wide area through soil drenching, foliar spraying, or the like.

DISCLOSURE OF INVENTION

Technical Problem

The present inventors endeavored to develop a microbial agent inducing resistance in pine trees and various plants. As a result, the present inventors established that a novel *Bacillus subtilis* JCK-1398 strain has a control effect against various plant pathogens including causative nematodes of pine wilt disease and this effect is due to the resistance-inducing activity of this strain, and thus completed the present invention.

Accordingly, an aspect of the present invention is to provide a *Bacillus subtilis* JCK-1398 strain (accession number KCTC 14084BP) that activates induced resistance in a plant against a disease and a pest.

Another aspect of the present invention is to provide a pesticide or antibiotic composition containing as an active ingredient at least one selected from the group consisting of a *Bacillus subtilis* JCK-1398 strain, a culture of the stain, a concentrate of the culture, a dried product of the culture, a culture supernatant of the strain, and a combination thereof.

Still another aspect of the present invention is to provide a composition for controlling plant diseases or pests, the composition containing as an active ingredient at least one selected from the group consisting of a *Bacillus subtilis* JCK-1398 strain, a culture of the stain, a concentrate of the culture, a dried product of the culture, a culture supernatant of the strain, and a combination thereof.

Still another aspect of the present invention is to provide a method for controlling plant diseases or pests by using at least one selected from the group consisting of a *Bacillus subtilisJCK-1398* strain, a culture of the stain, a concentrate of the culture, a dried product of the culture, a culture supernatant of the strain, and a combination thereof.

Solution to Problem

The present inventors endeavored to develop a microbial agent inducing resistance in pine trees and various plants. As a result, the present inventors established that a novel *Bacillus subtilis* JCK-1398 strain has resistance-inducing activity against various plant disease causative nematodes and bacteria including *Bursaphelenchus xylophilus*.

The present invention is directed to a pesticidal or antibiotic composition and a composition for controlling plant diseases or pests, each composition containing as an active ingredient a *Bacillus subtilis* JCK-1398 strain (accession number KCTC 14084BP) that activates induced resistance in plants, a culture of the strain, or the like. Hereinafter, the present invention will be described in more detail.

An aspect of the present invention is directed to a *Bacillus subtilis* JCK-1398 strain (accession number KCTC 14084BP).

The strain includes the nucleotide sequence of gyrA of SEQ ID NO: 33.

The nucleotide sequence of SEQ ID NO: 33 was identified as a novel strain since the nucleotide sequence has 99% homology and 1% heterogeneity with the reference strain CP021892.

The nucleotide sequence of gyrA (Gyrase A subunit) of the *Bacillus subtilis* JCK-1398 strain was identified through the Blast search in the GenBank database and the NCBI database.

The novel strain obtained was named a *Bacillus subtilis* JCK-1398 strain and deposited with the Korean Collection for Type Cultures under accession number KCTC 14084BP on 19 Dec. 2019.

The *Bacillus subtilis* JCK-1398 strain can be obtained by isolation and identification from a tomato plant, and properties of the strain are as follows:

The strain is a rod-shaped cylindrical *bacillus*, actively moves with flagella, and forms circular or oval spores in the center of the cell. The strain was well grown in even an ordinary incubator and forms large gray-white colonies with a radial shape at the periphery thereof. The strain has extremely strong resistance against dryness and high temperatures due to spores thereof, and the cell is a gram-positive bacterium containing glycogen and generates acids by degradation of multiple carbohydrates. The strain uses as energy sources carbon sources, such as D-glucose, L-arabinose, and sucrose.

In one example of the present invention, the resistance-inducing activity of the *Bacillus subtilis* JCK-1398 strain was investigated through an experiment using pine trees and various plants (FIGS. 3 to 9).

The *Bacillus subtilis* JCK-1398 strain has activity to control diseases and pests through resistance-inducing activity.

The *Bacillus subtilis* JCK-1398 strain has activity to control pests or plant diseases caused by phytopathogenic nematodes, pests, or phytopathogenic bacteria and fungi (molds).

The nematodes may be *Bursaphelenchus xylophilus*, but are not limited thereto.

The pests may be Aculops *lycopersici*, but are not limited thereto.

The bacteria and fungi may be *Xanthomonas* euvesicatoria and/or *Sclerotinia* homoeocarpa, but are not limited thereto.

The plant diseases may be pine wilt disease, bacterial spot, and/or dollar spot, but are not limited thereto.

Therefore, the *Bacillus subtilis* JCK-1398 strain of the present invention has plant disease control activity through the activity to inhibit the growth of phytopathogenic nematodes, bacteria, fungi, or pests by inducing resistance in hosts.

The *Bacillus subtilis* JCK-1398 strain induces a synergistic effect when combined with an existing induced resistance elicitor, and thus can be used in the eco-friendly control of plant diseases.

The induced resistance elicitor used as a combination agent with the *Bacillus subtilis* JCK-1398 strain may be acibenzolar-S-methyl (ASM) and/or methyl salicylate (MeSA), but is not limited thereto.

The *Bacillus subtilis* JCK-1398 strain, when combined with an existing synthetic bactericide (synthetic agrochemical), induces a synergistic effect, and thus the synthetic agrochemical, when used even at a concentration below a commonly used concentration, has a plant disease control effect equivalent to or higher than that when used at the commonly used concentration. Therefore, the strain can be used to reduce the commonly used concentration and use amount of a synthetic bactericide and to control plant diseases in an eco-friendly manner.

The synthetic agrochemical used as a combination agent with the *Bacillus subtilis* JCK-1398 strain may be tebuconazole, iprodione, fludioxonil, benomyl, and/or difenoconazole, but is not limited thereto.

Another aspect of the present invention is to provide a pesticide or antibiotic composition containing at least one selected from the group consisting of a *Bacillus subtilis* JCK-1398 strain (accession number KCTC 14084BP), a culture of the stain, a concentrate of the culture, a dried product of the culture, a culture supernatant of the strain, and a combination thereof.

Therefore, the present invention can provide a pesticide or antibiotic microbe agent containing at least one selected from the group consisting of a *Bacillus subtilis* JCK-1398 strain, a culture of the stain, a concentrate of the culture, a dried product of the culture, a culture supernatant of the strain, and a combination thereof, and can provide a pesticidal or antibiotic method by the treatment with the microbe agent.

The microbe agent may be formulated by a typical method, and may be prepared in the form of a dried powder or a liquid fertilizer. Specifically, the microbe agent of the present invention may be prepared in a liquid form, and the microbe agent may be used in the form of a powder by addition of an extender thereto or may be formulated to form granules. However, the microbe agent is not particularly limited to the formulation thereof.

The microbe agent in the present invention may be prepared by addition of an additive, an extender, a nutrient, or the like to a strain or a culture thereof. At least one selected from the group consisting of polycarboxylates, sodium lignosulfonates, calcium lignosulfonates, sodium dialkyl sulfosuccinates, sodium alkyl aryl sulfonates, polyoxyethylene alkyl phenyl ethers, sodium tripolyphosphates, polyoxyethylene alkyl aryl phosphoric esters, polyoxyethylene alkyl aryl ethers, polyoxyethylene alkyl aryl polymers, polyoxyalkylone alkyl phenyl ethers, polyoxyethylene nonyl phenyl ethers, sodium sulfonate naphthalene formaldehydes, Triton™MX-100, and Tween® 80 may be used as the additive; at least one selected from the group consisting of skim milk (medium), soy flour, rice, wheat, ocher, diatomite, bentonite, dextrin, glucose, and starch may be used as the extender and nutrient; and at least one selected from the group consisting of bentonite, talc, dialite, kaolin, and calcium carbonate may be used as a disintegrant.

Furthermore, the present invention provides a method for inducing resistance in a plant by treating soil or the plant with the microbe agent. The treating method may be carried out by a generally used method, that is, spraying (e. g., spraying, misting, atomizing, powder spraying, granular spraying, paddy water application, seeding box application, etc.), soil treatment (e. g., mixing, drenching, etc.), surface application (e. g., coating, smearing, coating, etc.), dipping, poison bait, smoking application, or the like. The amount of the microbe agent used may be appropriately determined according to the formulation, damage condition, application method, application place, and the like.

In the present invention, the effective amount of microorganisms contained in the agent used for the treatment by the method may be 1 to $1 \times 10^{100}$ microorganisms per arable land area (m2). The effective amount of microorganisms contained in the agent used for the treatment by spraying among the methods may be 1 to $1 \times 10^{100}$ microorganisms per ml, and the effective amount of microorganisms contained in the composition used for the treatment by dipping may be 1 to $1 \times 10^{100}$ microorganisms per ml.

Still another aspect of the present invention is to provide a composition for controlling plant diseases or pests, the composition containing at least one selected from the group consisting of a *Bacillus subtilis* JCK-1398 strain (accession number KCTC 14084BP), a culture of the stain, a concentrate of the culture, a dried product of the culture, a culture supernatant of the strain, and a combination thereof.

Each of the compositions of the present invention may contain not only the strain, the culture thereof, the concentrate of the culture, the dried product of the culture and/or the supernatant of the strain, which corresponds to an active ingredient, but also a culture containing cells of the strain, an extract of the cells, a concentrate, concentrated product, or dried product thereof, or if necessary, a diluted solution, a diluted product, or the like, and may include any one obtained by treatment of the culture or the cultured product.

The culturing, extracting, separating, concentrating, drying, diluting, and the like of the strain are not particularly limited.

Examples of a medium for culturing the strain therein may typically include milk proteins, such as skimmed milk, whey, and casein, sugars, and yeast extracts, and various types of general aerobic or anaerobic methods may be appropriately used for culturing.

After culturing of the strain, a culture or a supernatant thereof may be concentrated, dried, or diluted if necessary.

In addition, by separating a supernatant and cells of the culture from each other using centrifugation or membrane separation, the cells may be recovered in a concentrated state. The cells may be subjected to ultrasonic or enzymatic treatment or the like to extract ingredients in the cells, or a culture, a supernatant thereof, cells or an extract thereof, or the like may be dried. These may be used as active ingredients of the compositions of the present invention.

The overlapping description of the strain and each composition containing the same is omitted considering the complexity of the present specification.

Advantageous Effects of Invention

The present invention relates to a *Bacillus subtilis* JCK-1398 (accession number KCTC 14084BP) strain having resistance-inducing activity in pine trees and various plants, to a pesticidal or antibiotic composition and a composition for controlling plant diseases or pests, each composition containing the strain as an active ingredient, and to a control method using the same. It was experimentally confirmed that the *Bacillus subtilis* JCK-1398 strain of the present invention had control activity against pests, nematodes, and bacteria, which are causes of various plant diseases, by inducing resistance in hosts. Accordingly, the *Bacillus subtilis* JCK-1398 strain of the present invention can be advantageously used to control a related plant disease and can be sprayed in a wide area through foliar spraying, and thus the present invention is expected to prevent the spreading of pine wilt disease at low cost.

BRIEF DESCRIPTION OF DRAWINGS

FIG. 3A confirms the pine wilt disease control effect of the *Bacillus subtilis* JCK-1398 strain according to one example of the present invention, showing the seedling test result of a culture of the JCK-1398 strain on *Pinus densiflora* seedlings expressed by a disease progression curve.

FIG. 5A confirms the pine wilt disease control effect of the *Bacillus subtilis* JCK-1398 strain depending on the treatment time according to one example of the present invention, showing the seedling test result of the culture of the JCK-1398 strain on *Pinus densiflora* seedlings expressed by a disease progression curve.

FIG. 5B confirms the pine wilt disease control effect of the *Bacillus subtilis* JCK-1398 strain depending on the treatment time according to one example of the present invention, indicating a control effect of the culture of the JCK-1398 strain 60 days after inoculation with *Bursaphelenchus xylophilus*.

BEST MODE FOR CARRYING OUT THE INVENTION

The present invention is directed to a *Bacillus subtilis* JCK-1398 strain (accession number KCTC 14084BP) that activates induced resistance in a plant against disease and pests.

MODE FOR CARRYING OUT THE INVENTION

Hereinafter, the present invention will be described in more detail with reference to exemplary embodiments. These exemplary embodiments are only for illustrating the present invention, and it would be obvious to those skilled in the art that the scope of the present invention is not construed as being limited to the exemplary embodiments.

Example 1: Screening of Strains Inducing Induced Resistance

To obtain strains inducing induced resistance against pine wilt disease, 500 plant-originate microbial strains were isolated from various plants. Strains (25 strains) inducing induced resistance were selected from about the 500 isolated plant-originated microbial strains by using *Arabidopsis thaliana* transformed with a vector having PR-1 promoter labeled with GUS. The results are shown in Table 1 below.

TABLE 1

| Strain | Activity |
| --- | --- |
| JCK-757 | * |
| JCK-758-1 | * |
| JCK-758-2 | * |
| JCK-761 | * |
| JCK-767 | * |
| JCK-947 | * |
| JCK-1005 | * |
| JCK-1180 | * |
| JCK-1182 | * |

TABLE 1-continued

| Strain | Activity |
| --- | --- |
| JCK-1187 | * |
| JCK-1217 | * |
| JCK-1222 | * |
| JCK-1229 | * |
| JCK-1233 | * |
| JCK-1266 | * |
| JCK-1287 | * |
| JCK-1288 | * |
| JCK-1307 | * |
| JCK-1308 | * |
| JCK-1309 | * |
| JCK-1318 | * |
| JCK-1320 | * |
| JCK-1328 | * |
| JCK-1333 | * |
| JCK-1398 | * |

Example 2: In Vitro Induced Resistance Assay Using Pine Callus

The 25 strains selected in Example 1 were investigated for expression of induced resistance-related genes of *Pinus densiflora* callus.

Figure 1:
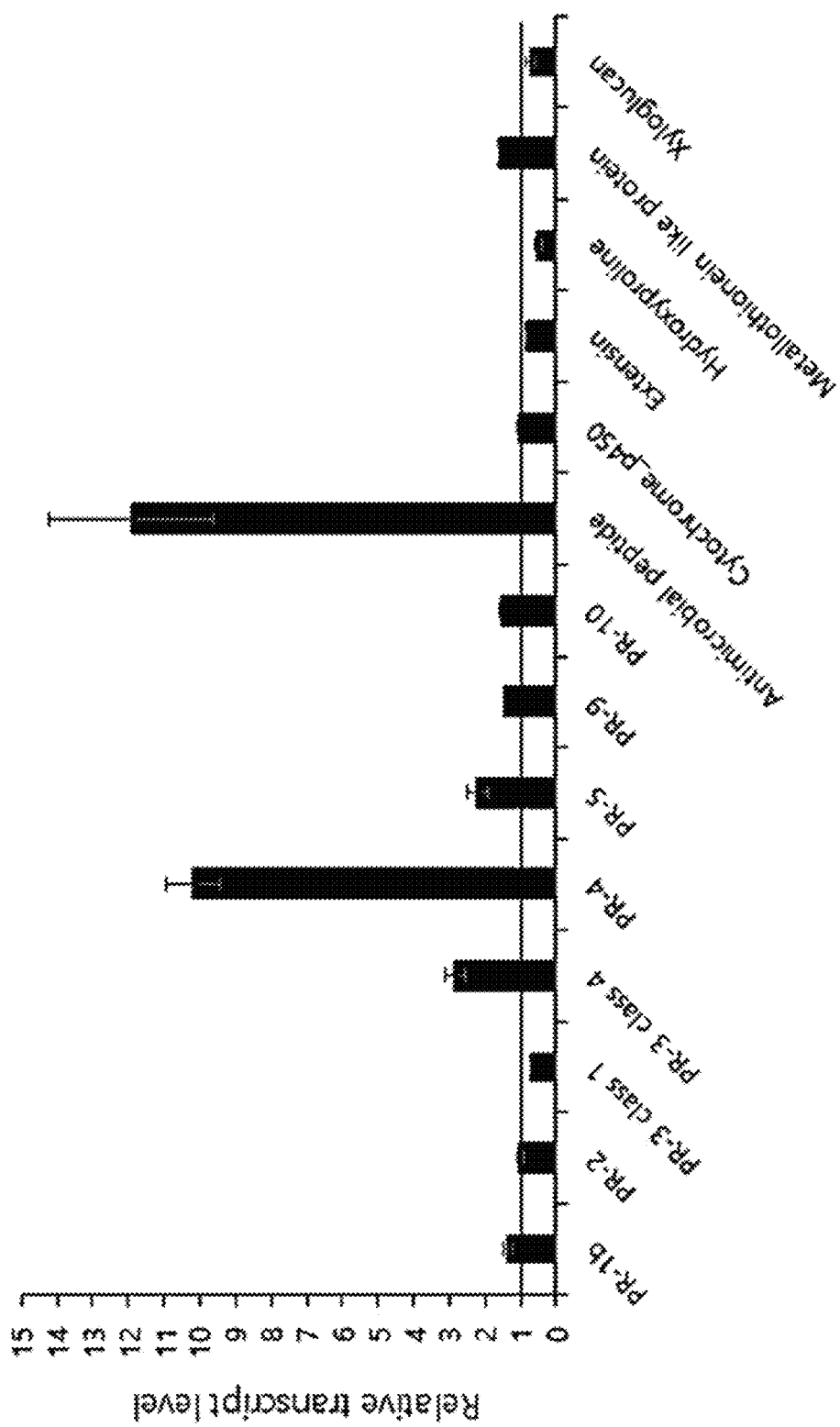
FIG. 1 confirms the expression of induced resistance-related genes by the *Bacillus subtilis* JCK-1398 strain according to one example of the present invention.

Specifically, a pine resistance-inducing strain was cultured in 500 μl of LM medium in 12-well microplates to an absorbance of 0.8 at 600 nm (OD 600), and then the surface of 100 mg of *Pinus densiflora* callus was treated with 500 μl of the culture, and the callus surface and the culture of the pine resistance-inducing strain were sufficiently incubated for 24 hours in a shaking incubator at 50 rpm and 25° C. in a dark condition. Then, the callus that had been incubated was separated by centrifugation at 600×g for 5 to 10 minutes using a centrifuge. RNA was extracted from the separated callus to synthesize cDNA, and the specifically increased expression of induced resistance-related genes was investigated through RT-PCR or qRT-PCR. The results are shown in FIG. 1 and Table 2. The induced resistance-related genes used in qRT-PCR are shown in Table 3 below.

TABLE 2

| No | Name | Expression level |
| --- | --- | --- |
| 1 | PR-1b family | 1.35 |
| 2 | PR-2 family | 1.02 |
| 3 | PR-3 family class 1 | 0.70 |
| 4 | PR-3 family class 4 | 2.84 |
| 5 | PR-4 family | 10.20 |
| 6 | PR-5 family | 2.21 |
| 7 | PR-9 family | 1.49 |
| 8 | PR-10 family | 1.56 |
| 9 | Antimicrobial peptide | 11.91 |
| 10 | Cytochrome P450 | 1.06 |
| 11 | Extensin | 0.84 |
| 12 | Hydroxyproline-rich glycoprotein precursor | 0.50 |
| 13 | Metallothionein-like protein | 1.59 |
| 14 | Xyloglucan endotransglycosylase | 0.72 |

TABLE 3

| SEQ ID NO | Name | Sequence (5'→3') | Size (bp) |
| --- | --- | --- | --- |
| 1 | PR-1b family For | TGCCCCTTCAGGTAAATCGT | 125 |
| 2 | PR-1b family Rev | GCGGGTCGTAGTTGCAGATAA | |

TABLE 3-continued

| SEQ ID NO | Name | Sequence (5'→3') | Size (bp) |
|---|---|---|---|
| 3 | PR-2 family For | CGACAACATTCGCCCCTTCT | 130 |
| 4 | PR-2 family Rev | CTGCAGCGCGGTTTGAATAT | |
| 5 | PR-3 family class 1 For | ACCTACAGCGCTTCATTGC | 120 |
| 6 | PR-3 family class 1 Rev | TGTGGTTTCATGCGACGTTT | |
| 7 | PR-3 family class 4 For | CCATCGAAGCCCAGGTAATTT | 90 |
| 8 | PR-3 family class 4 Rev | AGCCGGGAAGCAATATTATGGT | |
| 9 | PR-4 family For | CCCCGTTACTGTCAATTGCAT | 90 |
| 10 | PR-4 family Rev | AAAGCGTGACGGTGCGTATT | |
| 11 | PR-5 family For | GAACCAGTGCCCATACACAGTCT | 96 |
| 12 | PR-5 family Rev | CCTGCGGCAACGTTAAAAGTC | |
| 13 | PR-9 family For | ACACCACCGTGCTGGACATT | 118 |
| 14 | PR-9 family Rev | GTGCGGGAGTCGGTGTAGAG | |
| 15 | PR-10 family For | TGTCTCAAGTGGAGGCAAGGA | 90 |
| 16 | PR-10 family Rev | AAGCGACAATTTCAGGCAAAAC | |
| 17 | Antimicrobial peptide For | GCGTTGCTCATACCCGTTTT | 90 |
| 18 | Antimicrobial peptide Rev | GCAGCACTTAGCACTGGATGAA | |
| 19 | Cytochrome P450 For | AACATGTCCTGCAGCACGAA | 95 |
| 20 | Cytochrome P450 Rev | GTGCACCGCAAGTAAACCAA | |
| 21 | Extensin For | CGAATGTAATTCCGAAGTTGCA | 110 |
| 22 | Extensin Rev | CCATCCCAAACCACCAGTCT | |
| 23 | Hydroxyproline-rich glycoprotein precursor For | GAGAAACTGGCACCGTCTTAGGA | 140 |
| 24 | Hydroxyproline-rich glycoprotein precursor Rev | ACCTCCCCCTCCATCTCACA | |
| 25 | Metallothionein-like protein For | TCAGGCTGCTGCGTTATTTG | 120 |
| 26 | Metallothionein-like protein Rev | TGTCAGCGCAGTCACAATTTG | |
| 27 | Xyloglucan endotransglycosylase For | TCTGCGCCCCTACTTTTCC | 121 |
| 28 | Xyloglucan endotransglycosylase Rev | AGCTGGGCGATTGATCATGT | |
| 29 | Elongation factor-1 alpha For | GGGAAGCCACCCAAAGTTTT | 160 |
| 30 | Elongation factor-1 alpha Rev | TACATGGGAAGACGCCGAAT | |

As can be confirmed from FIG. 1 and Table 2, the present inventive *Bacillus subtilis* JCK-1398 strain among the 25 selected strains specifically increased genes for proteins, such as PR-1b family, PR-3 family class 4, PR-4 family, PR-5 family, PR-9 family, PR-10 family, antimicrobial peptide, and metallothionein-like protein.

Example 3: Molecular Biological Identification and Phylogenetic Classification

The *Bacillus subtilis* JCK-1398 strain was streaked on a tryptic soy agar (TSA, Difco) solid medium, followed by static culture at 30° C. for 1 day. The obtained single colonies were seeded into a tryptic soy agar (TSA, Difco) liquid medium by using a sterilized loop, followed by shaking culture at 30° C. and 150 rpm for 1 day. Then, genomic DNA (gDNA) of the strain was extracted using the DOKDO-Prep Bacterial Genomic DNA Purification Kit (Elpis Biotech) according to the protocol. The extracted gDNA was mixed with a polymerase chain reaction-premix (PCR-premix) by iNtRON Biotechnology and a primer set capable of amplifying gyrase A subunit (gyrA) gene, and then the gyrA gene of the JCK-1398 strain was amplified through PCR. The primer set used in PCR is shown in Table 4 below.

TABLE 4

| SEQ ID NO | Name | Sequence (5'-> 3') |
|---|---|---|
| 31 | gyrA For | CAG TCA GGA AAT GCG TAC GTC CTT |
| 32 | gyrA Rev | CAA GGT AAT GCT CCA GGC ATT GCT |

PCR was performed starting at 95° C. for 5 min, followed by 30 cycles of 95° C. for 30 s, 55° C. for 30 s, and 72° C. for 30 s, and then at 72° C. for 7 min, and the amplification was ended at 12° C. Nucleotide sequencing of the amplified PCR product was carried out by Genotech (Daejon, South Korea), and the nucleotide sequence of the gyrA gene of the JCK-1398 strain was obtained (SEQ ID NO: 33). The obtained nucleotide sequence of the gyrA gene was compared with nucleotide sequences of the GenBank database by using nBlast search in NCBI. In addition, nucleotide sequences of gyrA gene having high similarity were ensured from the GenBank database, and all the nucleotide sequences and the nucleotide sequence of the gyrA gene of the JCK-1398 strain were aligned by the BioEdit Sequence Alignment Editor, and phylogenetic analysis was carried out on the basis of the neighbor-joining (NJ) algorithm by using the Mega Program (version 6.0) with the number of bootstrap trials set to 1,000. The results are shown in FIG. 2.

TABLE 5

| SEQ ID NO | Name | Sequence (5' → 3') |
|---|---|---|
| 33 | Bacillus subtilis JCK-1398 strain gyrA sequence | GATGTTTGTAGAGCAGTTTGTTTGTA CAGATTGTTTAAGATGACATTCGCA TTGGCATCGCGTCTGATTTCAATGA CAATTCTCATACCTGTACGATCTGA CTCATCACGCAGATCTGTGATACCC TCTATCTTTTTGTCCCTTACGAGAT CAGCAATTTTCTCAATTAATTTCGC CTTATTTACTTGGTAAGGTAACTCT GTAACGATAATTCTTTCTTTACCCG AAGATGTTTGTTCGATCTCAGCTTT TGCCCGGATCGTGATAGAGCCTCGG CCTGATTCGTATGCTTTCCGGATAC CGCTGCGGCCCAAGATTTGACCCGC AGTCGGGAAATCAGGTCCTGGAATG ACTTCCATAAGCTCTGGAATGGTAA TGTCCGGATTCTCACTGACAGCAAG TACTCCGTCAATGATTTCTCCCAGC TGGTGCGGAGGAATGTTTGTTGCCA TACCTACCGCAATGCCGGCAGCACC GTTCACGAGCAGATTCGGGAACCTT GAAGGCATAACGACAGGTTCTCTTT CTGACCCGTCATAGTTATCCTGGTA ATCGATTGTGTCTTTTGTGATGTCA CGAAGAATCTCCATTGAGATTTTAG ACATTCTTGCTTCTGTATAACGCAT GGCCGCCGCTGAGTCTCCGTCAACA GAACCGAAGTTTCCGTGACCGTCAA CGAGCATATAACGGTAGTTGAAATC CTGAGCCATTCTGACCATGGATTCA TATACCGCTGAATCACCGTGCGGGT GGTATTTCCCGATAACTTCTCCAAC GATACGCGCGGATTTTTTATAAGGC TTGTCACTTGTCATGCCTAAATCAT TCATTGCATACAAAATCCGTCTATG AACTG |

Figure 2:
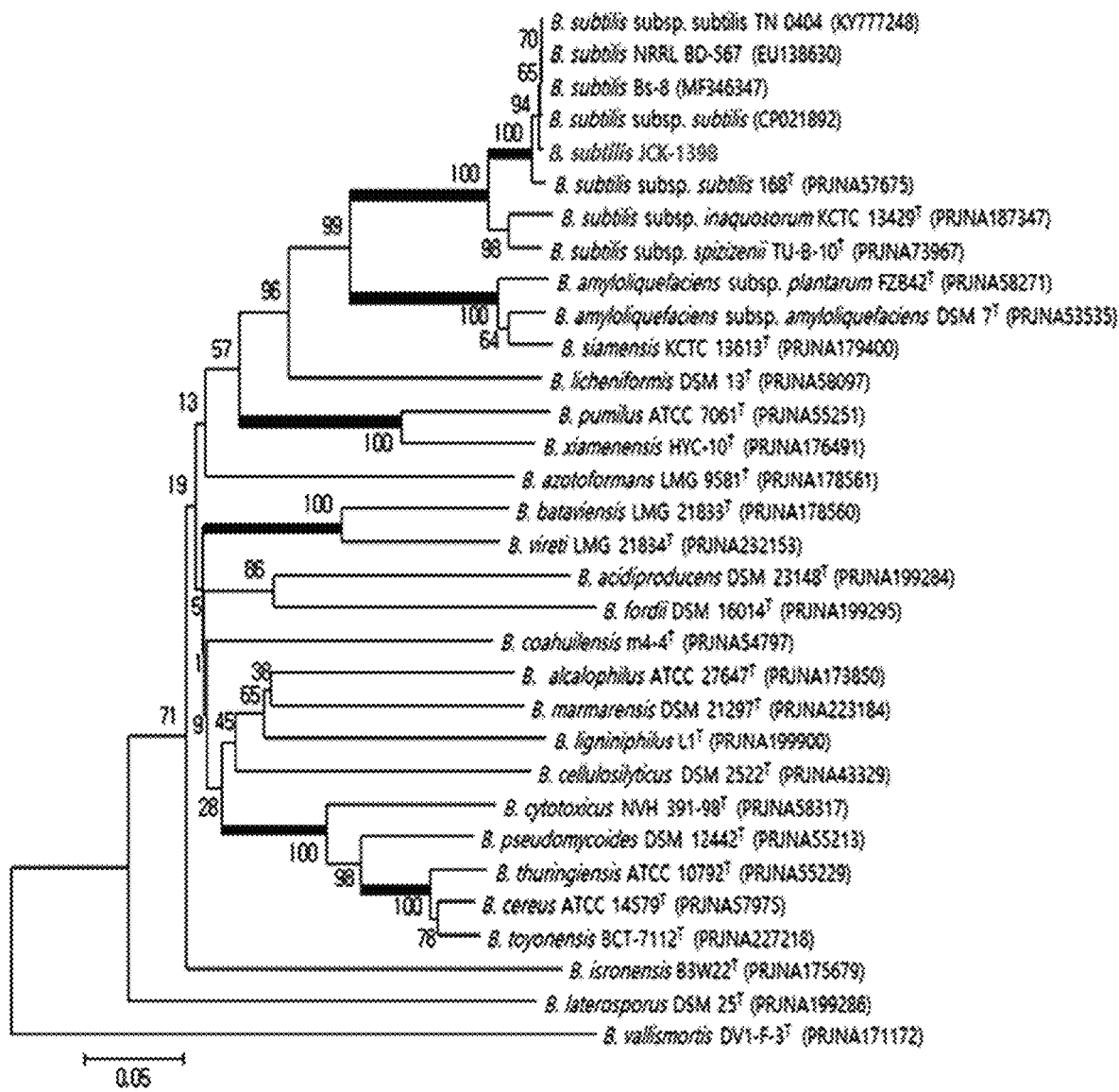
FIG. 2 shows the phylogenetic analysis result of the gyrA nucleotide sequence of the *Bacillus subtilis* JCK-1398 strain according to one example of the present invention.

As can be confirmed in FIG. 2, the JCK-1398 strain was identified as a Bacillus subtilis strain.

Example 4: Control Effect Against Pine Wilt Disease

To investigate the control effect of a culture of the Bacillus subtilis JCK-1398 strain against pine wilt disease, a seedling test was performed using Pinus densiflora seedlings aged 3-4 years (approximately 5.5 m in diameter and approximately 35-45 cm in height from the soil).

4-1. Preparation of Culture of JCK-1398 Strain

The JCK-1398 strain suspended in a 20% glycerol solution and stored in a −80° C. deep freezer was subjected to static culture in TSA at 30° C. for about 24 hours. Then, TSB was placed in a test tube, the entrance of which was then closed with a cotton plug, followed by sterilization. One colony of the cultured JCK-1398 strain was scraped by a platinum loop and seeded into TSB, and then further cultured with shaking at 150 rpm and 30° C. in an aerobic condition for about 24 hours. The culture of the JCK-1398 strain was placed in a 250-ml Erlenmeyer flask containing 50 ml of sterilized TSB until the optical density value was 1.0 at 600 nm in a UV spectrometer, thereby preparing a suspension. Then, shaking culture was performed at 30° C. and 150 rpm in the aerobic condition for about 24 hours.

4-2. Spraying of Culture of JCK-1398 Strain

First, each pine tree was sufficiently pre-treated with 5 ml of Tween® 20 (250 µg/ml) and then dried for 2 hours, so as to enable the culture of the JCK1398 strain to be well adsorbed into leaves. Then, the culture of the JCK-1398 strain obtained in Experimental Example 4-1 was diluted in an aqueous solution containing Tween® 20 (250 µg/ml) to an optical density value of 0.8, and then the resultant solution was placed in a fine sprayer and each pine tree was foliar-sprayed with 5 ml of the solution.

4-3. Culture of Bursaphelenchus xylophilus

Botrytis cinerea, which is food for Bursaphelenchus xylophilus, seeded into a potato dextrose agar (PDA) medium and was subjected to static culture for 7 days in a 25° C. incubator. Bursaphelenchus xylophilus (National Institute of Forest Science) was inoculated onto the cultured Botrytis cinerea, followed by static culture for 7 days in a 25° C. incubator. The cultured Bursaphelenchus xylophilus was harvested using the Baermann funnel method, and then adjusted to 20,000 nematodes/ml by examining the number of nematodes under an optical microscope.

4-4. Control Effect Against Pine Wilt Disease

About 1 cm of a woody part of the pine trees, which had been pre-treated with the culture of the JCK-1398 strain in Experimental Example 4-2 by foliar spraying, was cut to the deep endothelial area by a sterilized knife. Thereafter, a sterilized cotton wool made with 0.5 cm in width and 1 cm in length was inserted in the cut site, and the inoculation with the isolated Bursaphelenchus xylophilus at 2,000 nematodes in 100 µl (inoculation 1 week after the treatment with a chemical, such as the culture of the JCK-1398 strain) was performed, and the inoculated site was sealed with Parafilm to prevent drying (bark peeling inoculation method). The degree of wilting was observed 45 days after the inoculation with Bursaphelenchus xylophilus, and the results are shown in FIGS. 3A and 3B and Table 6.

TABLE 6

| Time after inoculation | | 0 Days | 34 Days | 39 Days | 42 Days | 45 Days | 50 Days |
|---|---|---|---|---|---|---|---|
| Disease severity (%) | JCK-1398 | 0 | 4 | 6 | 8 | 16 | 24 |
| | Untreated | 0 | 24 | 26 | 54 | 78 | 84 |

Figure 3A:
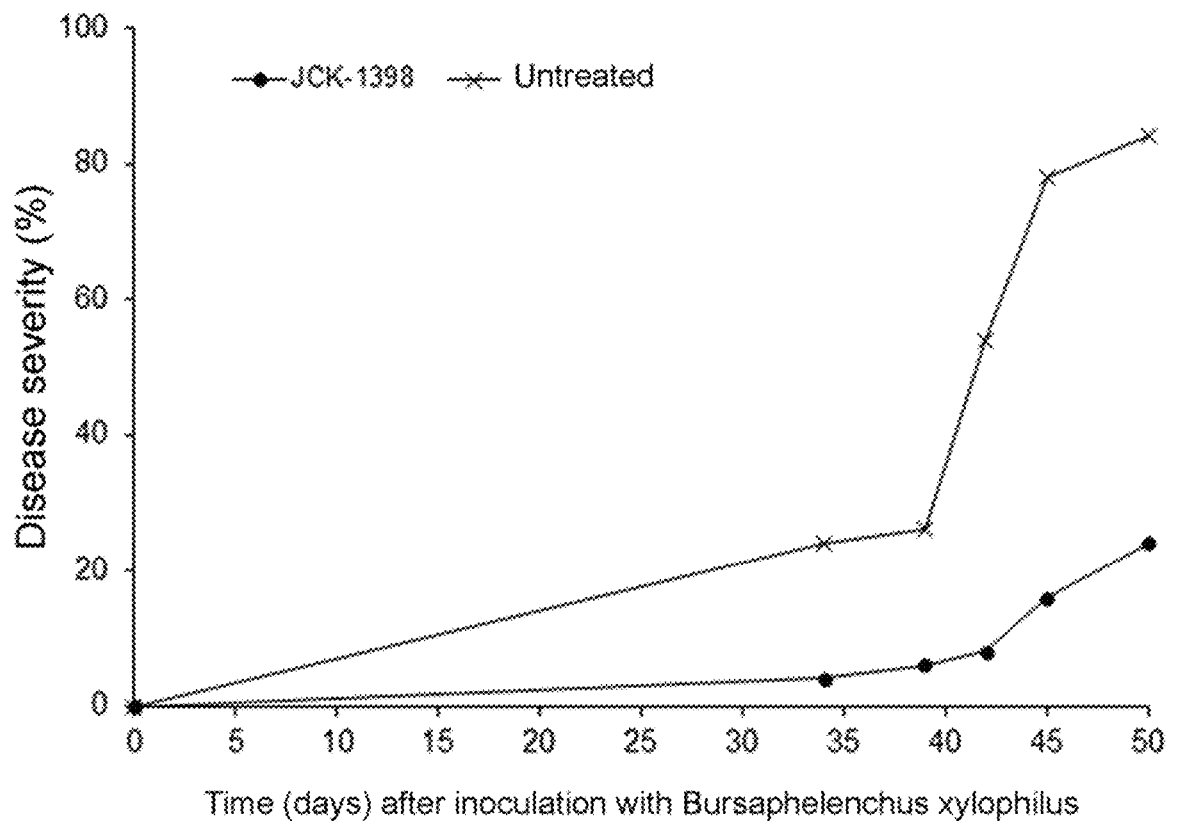
Figure 3B:
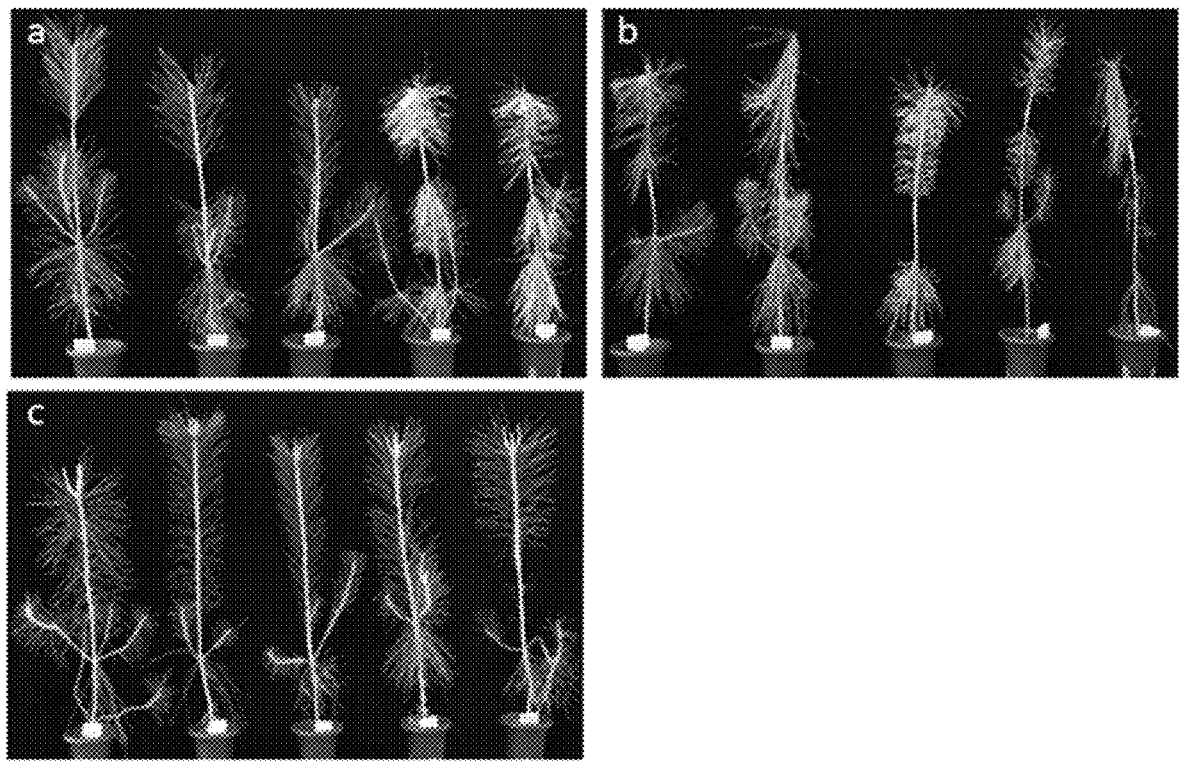
FIG. 3B confirms the pine wilt disease control effect of the *Bacillus subtilis* JCK-1398 strain according to one example of the present invention, showing *Pinus densiflora* seedlings treated with a culture of the JCK-1398 strain (a), untreated (b), and uninoculated (c).

As can be confirmed in FIGS. 3A to 3B and Table 6, the culture of the JCK-1398 strain showed a disease severity as low as 24% against pine wilt disease in the *Pinus densiflora* seedlings and a control value of 71.4% compared with an untreated group.

Example 5: Evaluation of In Vitro Nematicidal Activity 5-1. Securing of Culture Filtrate of JCK-1398 Strain and Nematodes to be Controlled The JCK-1398 strain was cultured by the same method as in Example 4-1 and then centrifuged at 13,000 rpm for 30 minutes by using a centrifuge, thereby harvesting a culture filtrate. The culture filtrate was subjected to bacterial eradiation using a 0.2 µm sterile micro-syringe filter.

As for *Meloidogyne incognita*, eggs thereof were obtained from tomato roots, which were artificially infected with *Meloidogyne incognita* in a greenhouse at Chonnam National University, Gwangju, Korea, and larvae (second instar larvae) hatched from the eggs were separated using the Baermann funnel method and used for experiments. *Bursaphelenchus xylophilus* was harvested by the same method as in Example 4-3.

5-2. Securing of Culture Filtrate of JCK-1398 Strain and Nematodes

A suspension of each nematode secured in Example 5-1 was placed in each well of a 96-well microplate, and then each well was treated with the culture filtrate of the JCK-1398 strain at a concentration of 0.625 to 20%, and thus the final volume of the well was 100 µl. After sample treatment, the 96-well plate was agitated for 30 seconds and stored at room temperature in a plastic case with a relative humidity of 100%. At 72 hours after sample treatment, nematicidal rates were determined using the following equation under an optical inverted microscope. Each experiment was repeated three times, and the results are shown in Table 7.

[Equation]

Nematicidal rate (%)=((mortality rate of treated group-mortality rate of control group)/(100-mortality rate of control group))×100

TABLE 7

| | Control value | | | | | |
|---|---|---|---|---|---|---|
| Nematode | 20% | 10% | 5% | 2.5% | 1.25% | 0.625% |
| *Meloidogyne incognita* | 97.45 | 13.15 | — | — | — | — |
| *Bursaphelenchus xylophilus* | — | — | — | — | — | — |

As can be seen in Table 7 above, *Meloidogyne incognita* showed a nematicidal activity of 97.45% in the group treated with a 20% culture filtrate and a nematicidal activity of 13.15% in the group treated with a 10% culture filtrate, but no nematicidal activity was shown at concentrations lower than 5%.

*Bursaphelenchus xylophilus* showed no nematicidal activity in any treated group, indicating that the control effect of *Bacillus subtilis* JCK-1398 against pine wilt disease was due to the induced resistance but not the direct nematicidal activity.

Example 6: Induced Resistance Elicitor Exhibiting Control Effect Against Pine Wilt Disease Based on the results of Example 5, the presence of induced resistance elicitors (a culture, a culture filtrate, and a cell fraction) exhibiting the control effect of the *Bacillus subtilis* JCK-1398 strain against pine wilt disease was investigated. The JCK-1398 strain was cultured by the same method as in Example 4-1 and adjusted to an optical density value of 0.8.

The culture of the JCK-1398 strain was separated into a culture filtrate and a cell fraction by centrifugation (1,300 rpm, 15 min). The precipitated cell fraction was suspended by addition of the same volume of phosphate-buffered saline used before centrifugation. Each pine tree was sufficiently pre-treated with 5 ml of Tween® 20 (250 µg/ml) and then dried for 2 hours, so as to enable each sample (a culture, a culture filtrate, and a cell fraction) to be well adsorbed into leaves. Then, each of the culture, culture filtrate, and cell fraction was dissolved in an aqueous solution containing Tween® 20 (250 µg/ml) to an optical density value of 0.8, and then placed in a fine sprayer and each pine tree was foliar-sprayed with 5 ml of each sample. The nematicidal substance emamectin benzoate as a control group was dissolved in an aqueous solution containing 10% methanol to 20 mg/ml, followed by trunk injection. The results are shown in FIGS. 4A and 4B and Table 8.

TABLE 8

| Treated group | Culture | Culture filtrate | Cell fraction | EB |
|---|---|---|---|---|
| Control value (%) | 61.7 | 64.2 | 42.0 | 97.0 |

Figure 4A:
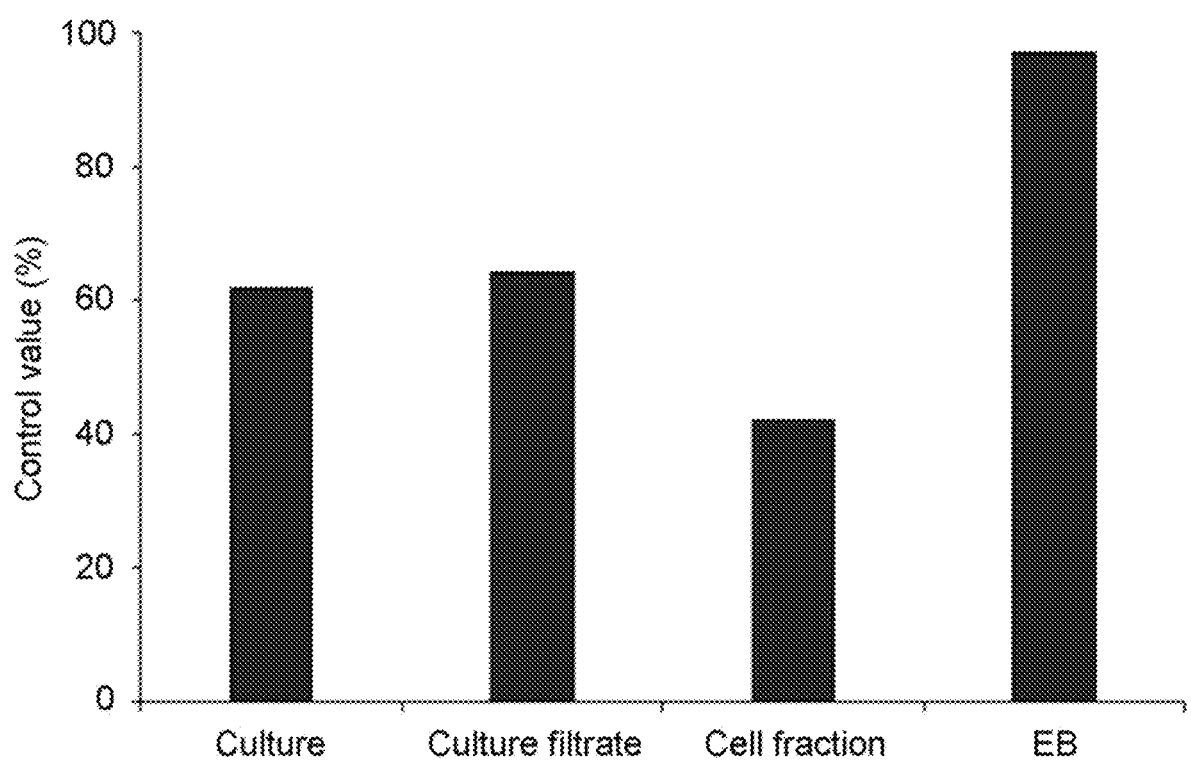
FIG. 4A confirms the pine wilt disease control effects of the *Bacillus subtilis* JCK-1398 strain according to one example of the present invention, showing the pine wilt disease control effects of a culture, culture filtrate, and cell fraction of the JCK-1398 strain at O.D 600=0.8.
Figure 4B:
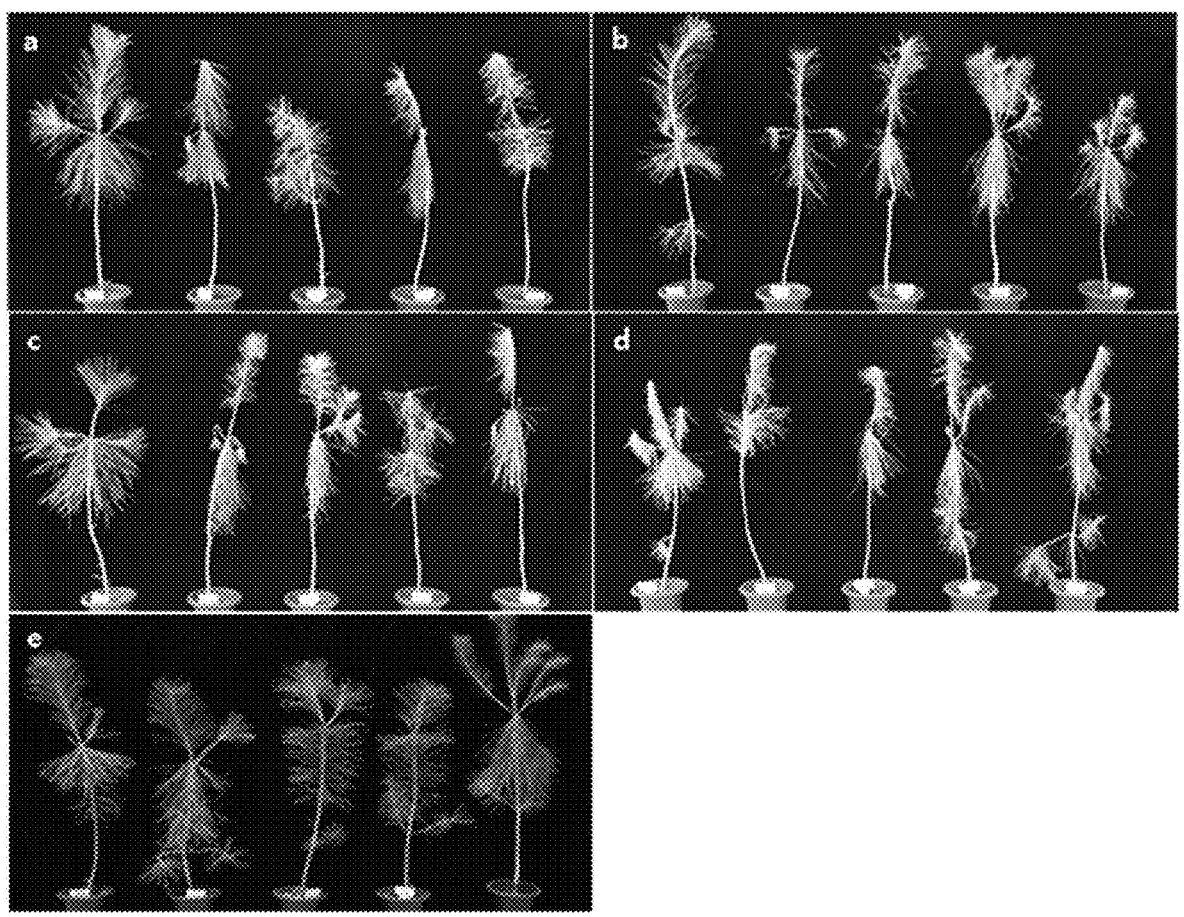
FIG. 4B confirms the pine wilt disease control effects of the *Bacillus subtilis* JCK-1398 strain according to one example of the present invention, showing *Pinus densiflora* seedlings treated with a culture of the JCK-1398 strain (a), a culture filtrate of the JCK-1398 strain (b), a cell fraction of the JCK-1398 strain (c), untreated (d), and uninoculated (e).

As can be confirmed in FIGS. 4A and 4B and Table 8, the culture and culture filtrate of the JCK-1398 strain exhibited control effects of 61.7% and 64.2%, respectively, but the cell fraction thereof exhibited a slightly low control effect of 42%.

These results indicate that the control effect of the JCK-1398 strain against pine wilt disease was due to extracellular secretions.

Example 7: Optimal Treatment Time for Control Effect Against Pine Wilt Disease

Based on the results of Example 6, the optimal treatment time was investigated through in vivo assay of the culture of the *Bacillus subtilis* JCK-1398 strain against pine wilt disease. The in vivo assay was performed using *Pinus densiflora* seedlings aged 3-4 years (approximately 5.5 m in diameter and approximately 35-45 cm in height from the soil).

Figures 5A, 5B:
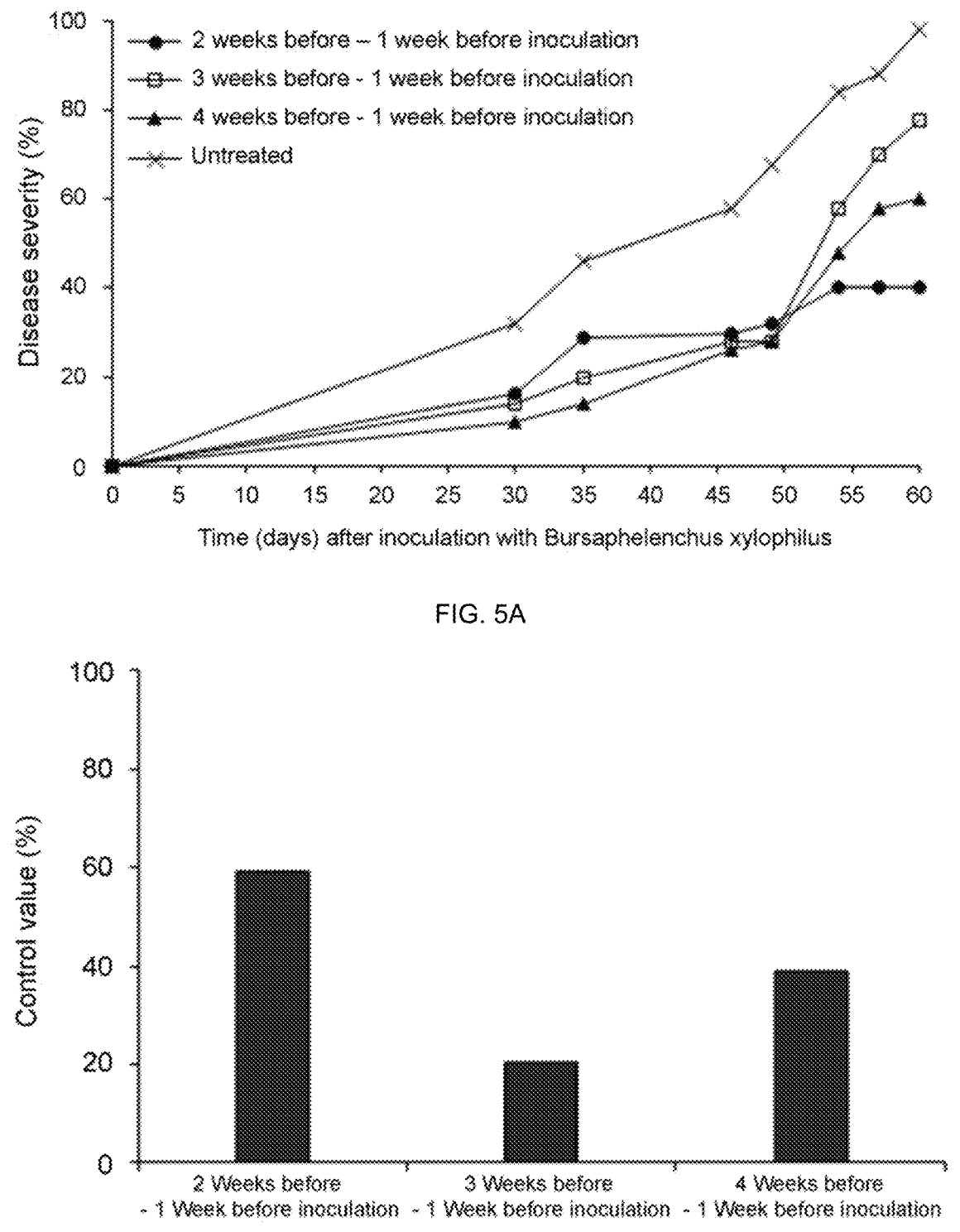
Figure 5C:
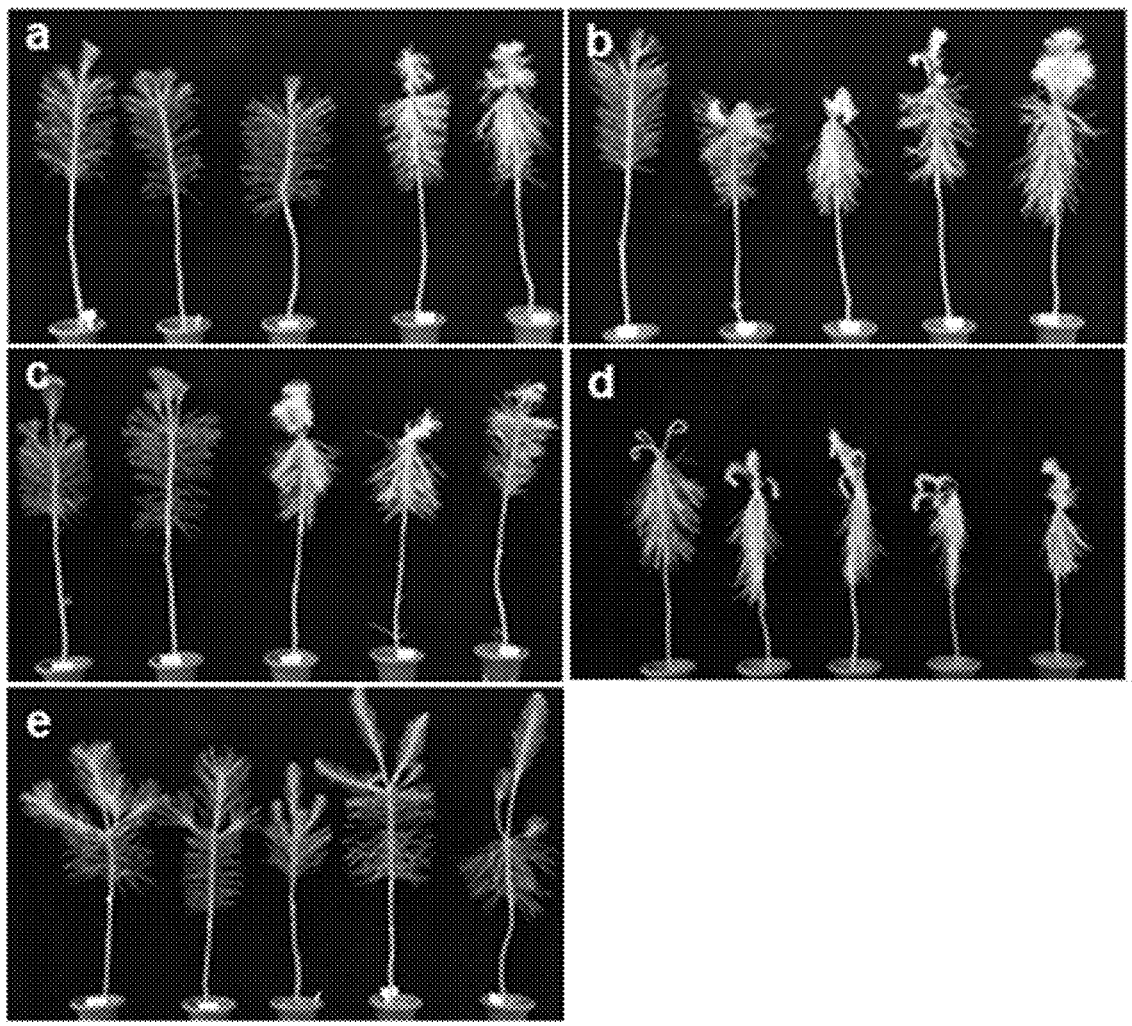
FIG. 5C confirms the pine wilt disease control effect of the *Bacillus subtilis* JCK-1398 strain depending on the treatment time according to one example of the present invention, showing *Pinus densiflora* seedlings treated 2 weeks before-1 week before (a), 3 weeks before-1 week before (b), and 4 weeks before-1 week before (c) inoculation with *Bursaphelenchus xylophilus*, untreated (d), and uninoculated (e).

The JCK-1398 strain was cultured by the same method as in Example 4-1 and adjusted to an optical density value of 0.8, and then each pine tree was foliar-sprayed with 5 ml of the culture. The treatment with the culture was performed twice at different times: 2 weeks and 1 week before, 3 weeks and 1 week before, and 4 weeks and 1 week before inoculation with *Bursaphelenchus xylophilus*. The inoculation with *Bursaphelenchus xylophilus* was performed 7 days after the second treatment with the culture by the same method as in Example 4-4. Last, the degree of wilting was observed 60 days after the inoculation with *Bursaphelenchus xylophilus*, and the results are shown in FIGS. 5A to 5C and Tables 9 and 10.

TABLE 9

| Time after inoculation | | 0 Days | 30 Days | 35 Days | 46 Days | 49 Days | 54 Days | 57 Days | 60 Days |
|---|---|---|---|---|---|---|---|---|---|
| Disease severity (%) | 2 weeks before - 1 week before | 0 | 16 | 29 | 30 | 32 | 40 | 40 | 40 |
| | 3 weeks before - 1 week before | 0 | 14 | 20 | 28 | 28 | 58 | 70 | 78 |
| | 4 weeks before - 1 week before | 0 | 10 | 14 | 26 | 28 | 48 | 58 | 60 |
| | Untreated group | 0 | 32 | 46 | 58 | 68 | 84 | 88 | 98 |

TABLE 10

| Treated group | 2 weeks before- 1 week before | 3 weeks before- 1 week before | 4 weeks before- 1 week before |
|---|---|---|---|
| Control value (%) | 59.2 | 20.4 | 38.8 |

As can be confirmed in FIGS. 5A to 5C and Tables 9 and 10, the disease severity of pine wilt disease was maintained at similar levels regardless of the treatment time until 49 days after the inoculation, but thereafter, the disease severity was greatly changed depending on the treatment time (FIG. 5A). Consequently, the treatment at 2 weeks before-1 week before inoculation (59.2%) showed an excellent control effect compared with the treatment at 3 weeks before-1 week before inoculation (20.4%) and the treatment at 4 weeks before-1 week before inoculation (38.8%).

Example 8: Optimal Treatment Concentration for Control Effect Against Pine Wilt Disease Based on the results of Example 7, the optimal treatment concentration was investigated through in vivo assay of a spray-dried powder of the *Bacillus subtilis* JCK-1398 strain against pine wilt disease. Likewise, the in vivo assay was performed using *Pinus densiflora* seedlings aged 3-4 years.

Figure 6:
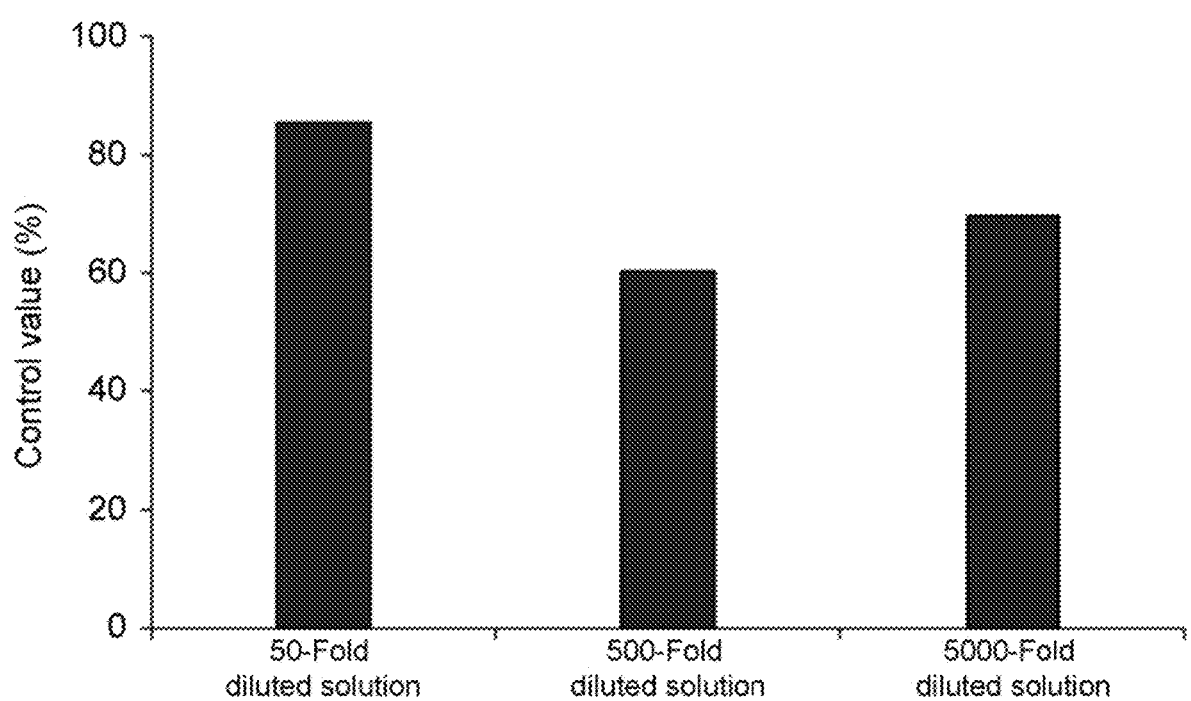
FIG. 6 confirms the pine wilt disease control effect of the *Bacillus subtilis* JCK-1398 strain depending on the treatment concentration according to one example of the present invention.

Specifically, a spray-dried powder of the JCK-1398 strain prepared by the method in Table 11 was prepared into 50-fold, 500-fold and 5,000-fold diluted solutions by using sterile water, and then each pine tree was foliar-sprayed with each diluted solution twice at an interval of 7 days by the same method as in Example 4-2. Last, *Bursaphelenchus xylophilus* was inoculated 7 days after the second treatment with the diluted solution by the same method as in Example 4-4. The degree of wilting was observed 55 days after the inoculation with *Bursaphelenchus xylophilus*, and the results are shown in FIG. 6 and Table 12.

TABLE 11

| Spray drying | JCK-1398 |
|---|---|
| Inlet and outlet temperatures | 190~198° C./90~98° C. |
| Spraying rate | 10,000 rpm |
| Carrier | Culture 70 L |
| Spray-dried powder | 11 kg |
| QC | $2.4 \times 10^9$ cfu/g |
| CFU (x50) | $4.8 \times 10^7$ cfu/g |

TABLE 12

| Treated group | 50-Fold diluted solution | 500-Fold diluted solution | 5000-Fold diluted solution |
|---|---|---|---|
| Control value (%) | 85.5 | 60.5 | 69.8 |

As can be confirmed in FIG. 6 and Table 12, the 50-fold diluted solution (85.5%) of the spray-dried powder of the JCK-1398 strain showed an excellent control effect compared with the 500-fold diluted solution (60.47%) and the 5,000-fold diluted solution (69.77%).

Example 9: Control Effect Against Pine Wilt Disease

Based on the above results, the field test was additionally performed using *Pinus densiflora* adult trees aged 15 years (root diameter: 8-11 cm, height: 6-8 m) in order to investigate the control effect of the *Bacillus subtilis* JCK-1398 strain against pine wilt disease in adult trees. The field test was performed twice in 2018 (first field test) and 2019 (second field test). In the first field test, a spray-dried powder of a culture of the JCK-1398 strain (prepared by the same method as in Example 8) was used, and in the second field test, a spray-dried powder of a culture of the JCK-1398 strain was formulated into JCK-1398 20% SC (emulsion) before use. The JCK-1398 20% SC formulation was formulated with a composition of a JCK-1398 spray-dried powder (20.0%), CR-NF 135B (4.5%), xanthan gum (0.03%), a defoamer (0.1%), and water (75.37%).

Figure 7A:
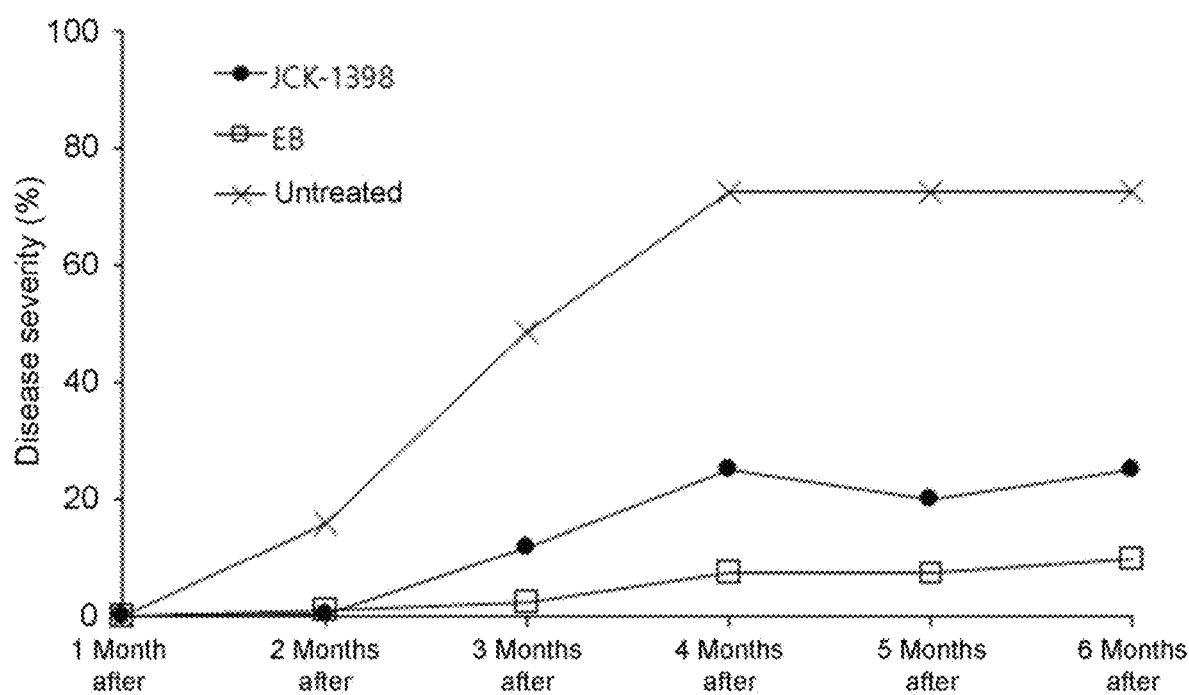
FIG. 7A confirms the pine wilt disease control effect of the *Bacillus subtilis* JCK-1398 strain according to one example of the present invention, showing the seedling test result of a culture of the JCK-1398 strain on *Pinus densiflora* adult trees expressed by a disease progression curve.
Figure 7B:
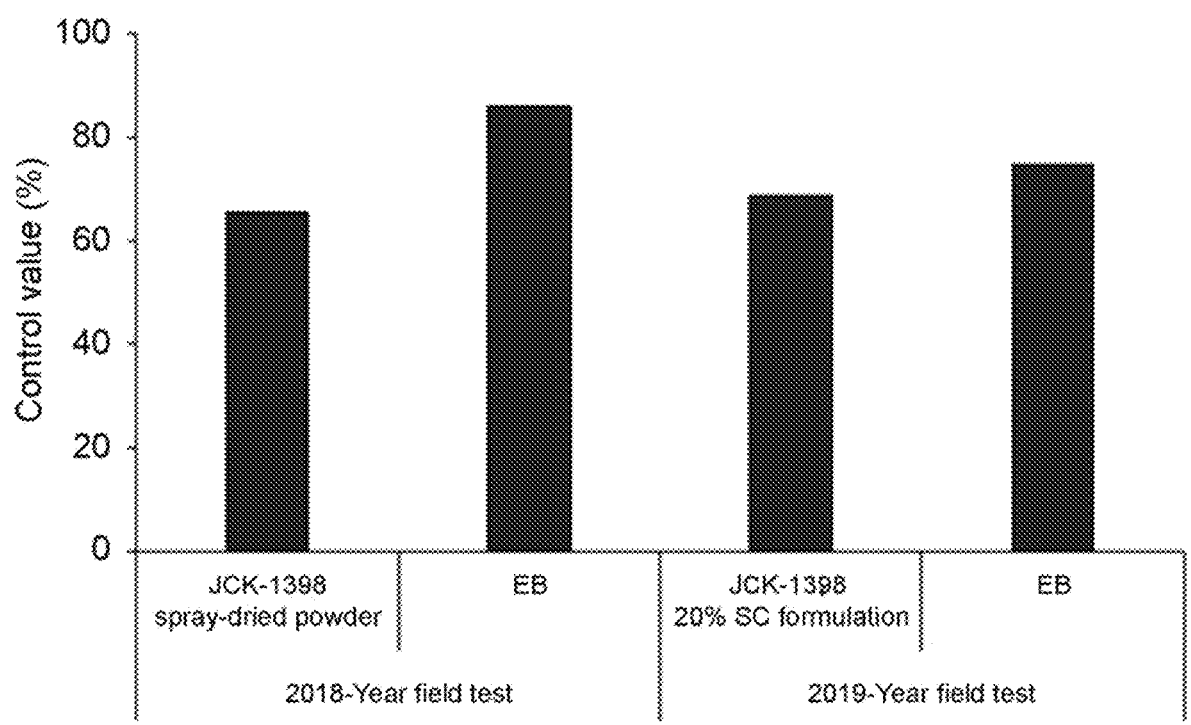
FIG. 7B confirms the pine wilt disease control effects of the *Bacillus subtilis* JCK-1398 strain according to one example of the present invention, showing the control effects of the *Bacillus subtilis* JCK-1398 strain through first and second field tests.
Figure 7C:
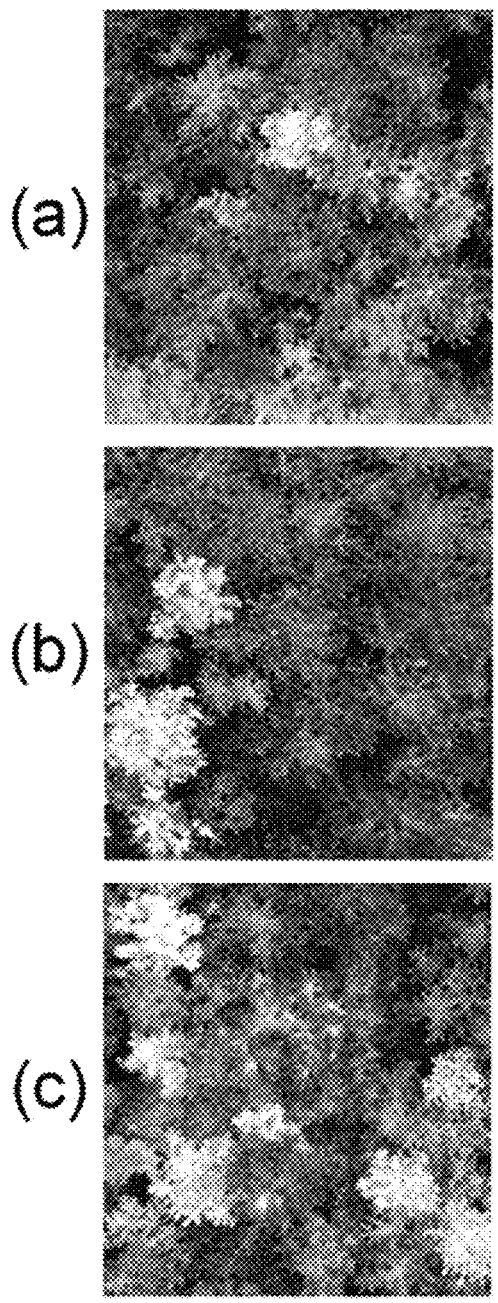
FIG. 7C confirms the pine wilt disease control effect of the *Bacillus subtilis* JCK-1398 strain according to one example of the present invention, showing *Pinus densiflora* adult trees treated with a 50-fold diluted solution of a spray-dried powder of the JCK-1398 strain (a), emamectin benzoate (b), and uninoculated (c).

The spray-dried powder of the culture of the JCK-1398 strain and the JCK-1398 20% SC formulation were diluted 50-fold and 2000-fold, respectively, in an aqueous solution containing 250 µg/ml Tween® 20, and then placed in a sprayer, and each pine tree was foliar-sprayed with about 1 L of each diluted solution. The treatment by foliar spraying was performed twice at an interval of 1 month. One week after each second treatment, each pine tree was inoculated, by trunk injection, with *Bursaphelenchus xylophilus* at 20,000 nematodes in the first field test and at 10,000 nematodes in the second field test. For a control group, A-Pharm (emamectin benzoate 2.15%, emulsion, Syngenta) was applied at 1 ml per diameter at breast by trunk injection, and the A-Pharm was applied once 1 week before the inoculation with *Bursaphelenchus xylophilus*. The untreated group was treated with only 250 μg/ml Tween@ 20 without chemical agents in the same manner. The results are shown in FIGS. 7A to 7C and Tables 13 and 14.

TABLE 13

| Times after inoculation | | 1 Month | 2 Months | 3 Months | 4 Months | 5 Months | 6 Months |
|---|---|---|---|---|---|---|---|
| Disease severity (%) | JCK-1398 | 0 | 0.5 | 12 | 25 | 20 | 25 |
| | EB | 0 | 1 | 2.5 | 7.5 | 7.5 | 10 |
| | Untreated group | 0 | 16 | 48.5 | 72.5 | 72.5 | 72.5 |

TABLE 14

| | 2018-Year field test | | 2019-Year field test | |
|---|---|---|---|---|
| Treated group | Spray-dried powder of JCK-1398 | EB | JCK-1398 20% SC formulation | EB |
| Control value (%) | 65.5 | 86.2 | 68.8 | 75 |

As can be confirmed in FIGS. 7A to 7C and Tables 13 and 14, the 50-fold diluted solution of the spray-dried powder of the JCK-1398 stain (JCK-1398) and the JCK-1398 20% SC formulation (20% SC formulation) exhibited control effects of 65.5% and 68.8%, respectively, compared with the untreated group. The reproducibility of the control effect of the JCK-1398 strain against pine wilt disease was confirmed through two field tests.

Example 10: Synergistic Effect of Pine Wilt Disease Control by Combination Agents Based on the results of the examples, a field test was additionally performed using *Pinus densiflora* adult trees aged 15 years (root diameter: 8-11 cm, height: 6-8 m) in order to investigate the control effect of combination agents of the *Bacillus subtilis* JCK-1398 strain with the induced resistance elicitors acibenzolar-S-methyl (ASM) and methyl salicylate (MeSA) against pine wilt disease in adult trees.

A JCK-1398 20% SC formulation, an ASM 5% SC formulation, and a MeSA 20% EC-LV agent were prepared to 2000-fold dilution, 0.1 mM, and 0.5 mM, respectively. A JCK-1398 20% SC+ASM 5% SC combination agent and a JCK-1398 20% SC+MeSA 20% EC-LV combination agent were prepared such that the final concentrations thereof included the half the concentration of each single agent in the treated groups. Each sample was placed in a sprayer, and each pine tree was treated with 1 L of each sample twice at an interval of 1 month. One week after the second treatment, the inoculation with 10,000 nematodes of *Bursaphelenchus xylophilus* was performed by trunk injection. As for a control group, A-Pharm (emamectin benzoate 2.15%, emulsion, Syngenta) was applied at 1 ml per diameter at breast by trunk injection, and the A-Pharm was applied once one week after the inoculation with *Bursaphelenchus xylophilus*. The untreated group was treated with only 250 μg/ml Tween® 20 without chemical agents in the same manner. The results are shown in FIG. 8 and Table 15.

TABLE 15

| Treated group | ASM 5% SC | MeSA 20% EC-LV | JCK-1398 20% SC | ASM 5% SC + JCK-1398 20% SC | MeSA 20% EC-LV + JCK-1398 20% SC | EB 2.15% EC |
|---|---|---|---|---|---|---|
| Control value (%) | 27.3 | 33.9 | 23.1 | 46.2 | 53.8 | 61.5 |

Figure 8:
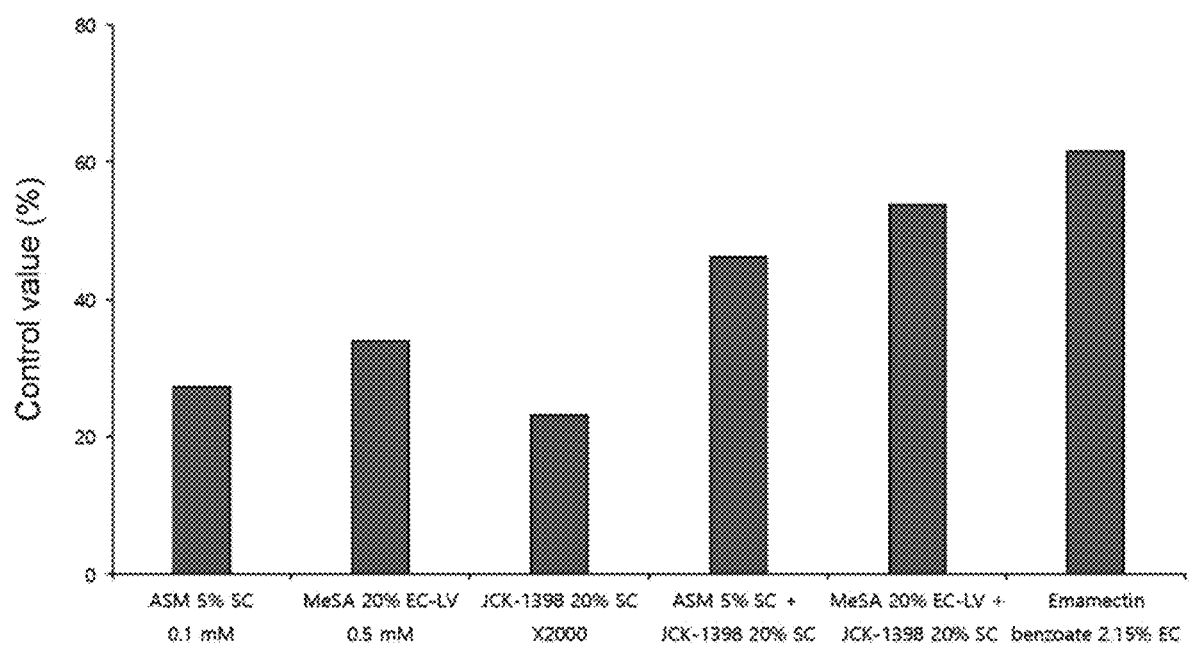
FIG. 8 confirms the pine wilt disease control effects of combination agents of a *Bacillus subtilis* JCK-1398 20% SC formulation and the induced resistance elicitors ASM and MeSA according to one example of the present invention.

As can be confirmed in FIG. 8 and Table 15, the JCK-1398 20% SC formulation, the ASM 5% SC formulation, the MeSA 20% EC-LV formulation showed control effects of 23.1%, 27.3%, and 33.9%, respectively, compared with an untreated group. However, the JCK-1398 20% SC+ASM 5% SC combination agent and the JCK-1398 20% SC+MeSA 20% EC-LV combination agent showed synergistic control effects of 46.2% and 53.8%, respectively, compared with the untreated group.

It was therefore confirmed that the *Bacillus subtilis* JCK-1398 strain can control pine wilt disease more effectively through a synergistic effect when applied together with the induced resistance elicitors ASM and MeSA.

Example 11: Preparation of Aerial Spraying Formulations and Control Effects Thereof Against Pine Wilt Disease In order to investigate the control effects of the *Bacillus subtilis* JCK-1398 strain against pine wilt disease through aerial spraying in adult trees, a novel formulation was prepared. The JCK-1398 10% SC formulation was formulated with a composition of a spray-dried powder of JCK-1398 (10.0%), CR-NF 135B (3.0%), xanthan gum (0.01%), a defoamer (0.1%), propylene glycol (5.0%), sodium benzoate (0.2%), and water (81.69%).

The JCK-1398 10% SC formulation and the JCK-1398 20% SC formulation (existing formulation, Example 9) each were prepared into 10-fold, 100-fold, and 500-fold diluted solutions, and each pine tree aged 3 years was foliar-sprayed with 100 μl (1/50 of the existing treatment amount) of each of the diluted solutions twice at an interval of 7 days, 2 weeks and 1 week before inoculation. Last, the inoculation with *Bursaphelenchus xylophilus* was performed 7 days after the second treatment with the diluted solution by the same method as in Example 4-4, and the degree of wilting was determined 40 days after the inoculation with *Bursaphelenchus xylophilus*. The results are shown in FIG. 9 and Table 16.

TABLE 16

| Treated group | JCK-1398 20% SC | | | JCK-1398 10% SC | | | EB |
| --- | --- | --- | --- | --- | --- | --- | --- |
| | 10-fold diluted solution | 100-fold diluted solution | 500-fold diluted solution | 10-fold diluted solution | 100-fold diluted solution | 500-fold diluted solution | |
| Control value (%) | 51.7 | 58.6 | 79.3 | 87.9 | 79.3 | 86.2 | 100.0 |

Figure 9:
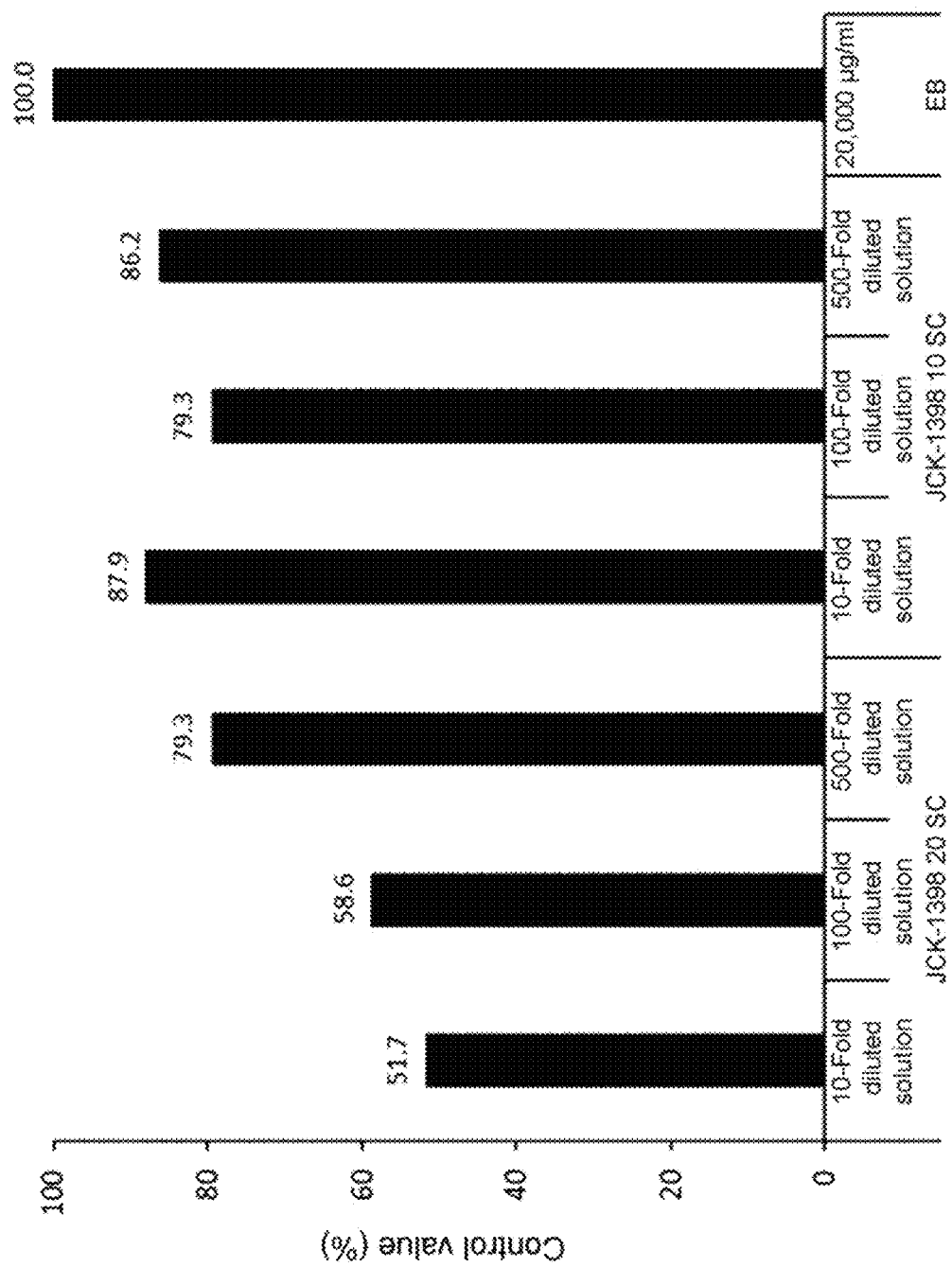
FIG. 9 confirms the pine wilt disease control effects of a *Bacillus subtilis* JCK-1398 20% SC formulation and a *Bacillus subtilis* JCK-1398 10% SC formulation at various concentrations according to one example of the present invention.

As can be confirmed in FIG. 9 and Table 16, when compared with the JCK-1398 20% SC formulation, the JCK-1398 10% SC formulation exhibited stable control effects at all the concentrations of the 10-fold diluted solution (87.9%), the 100-fold diluted solution (79.3%), and the 500-fold diluted solution (86.2%). Therefore, JCK-1398 10% SC was selected as a final formulation for subsequent aerial spraying.

Example 12: Evaluation of practical application of JCK-1398 10% SC formulation for aerial spraying in *Bursaphelenchus xylophilus* control On the basis of the results, a field test was performed using *Pinus densiflora* aged 30 years in order to investigate the control effect of JCK-1398 10% SC for aerial spraying against pine wilt disease in adult trees.

After a 50-fold diluted solution of the JCK-1398 10% SC formulation was prepared, 3.6 L (80 L/1 ha) of the diluted solution was aerial-sprayed to the Jinju Experimental Forest (450 M2) by using an unmanned aerial vehicle or unmanned helicopter. The treatment by aerial spraying was performed three times, 2 months before, 1 month before, and 1 month after inoculation with *Bursaphelenchus xylophilus*. One week after the second treatment, each pine tree was inoculated with 20,000 worms of *Bursaphelenchus xylophilus* by the same method as in Example 9. The results are shown in FIGS. 10A and 10B and Table 17.

TABLE 17

| | Disease severity (%) | | | | | |
| --- | --- | --- | --- | --- | --- | --- |
| Treated group | 0 Months after | 1 Month after | 2 Months after | 3 Months after | 4 Months after | 6 Months after |
| JCK-1398 10% SC | 0.0 | 0.0 | 0.0 | 3.3 | 3.3 | 20.0 |
| Untreated group | 0.0 | 0.0 | 0.0 | 20.0 | 23.3 | 73.3 |

Figure 10A:
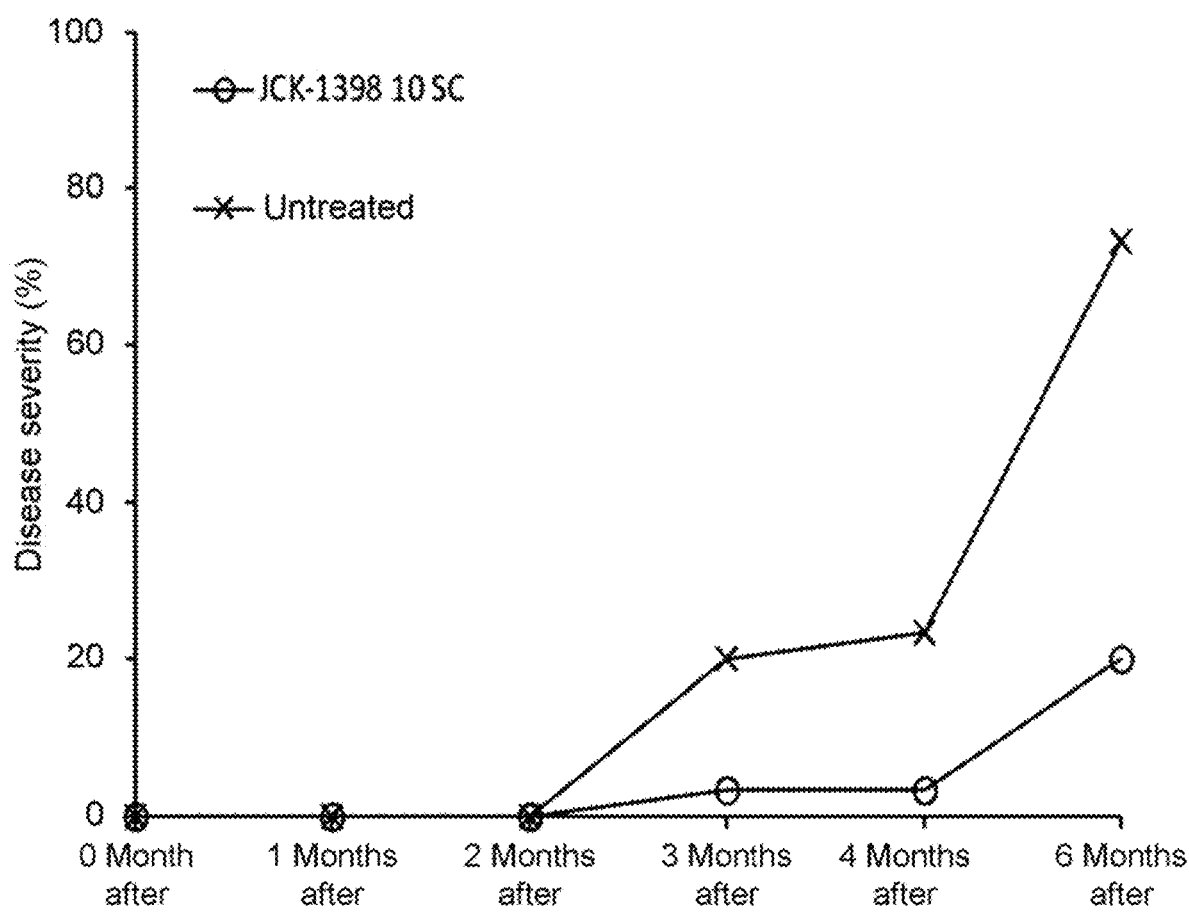
FIG. 10A confirms the pine wilt disease control effect of a *Bacillus subtilis* JCK-1398 10% SC formulation in adult trees aged 30 years according to one example of the present invention, showing the evaluation result of practical application by use using an unmanned helicopter, expressed by a disease progression curve.
Figure 10B:
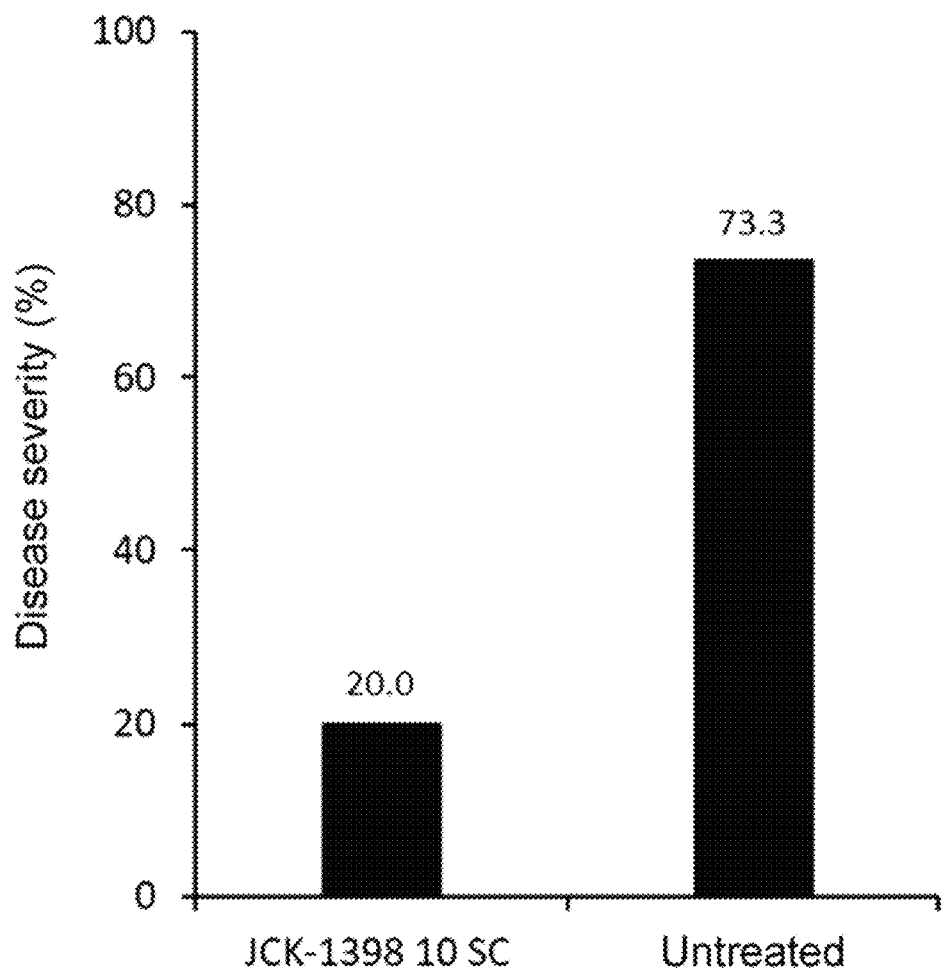
FIG. 10B confirms the pine wilt disease control effect of a *Bacillus subtilis* JCK-1398 10% SC formulation in adult trees aged 30 years according to one example of the present invention, showing the disease severity 6 months after the inoculation with *Bursaphelenchus xylophilus*.

As can be confirmed in FIGS. 10A and 10B and Table 17, the JCK-1398 10% SC formulation (20.0%) showed very low severity compared with the untreated group (73.3%), 6 months after the inoculation with *Bursaphelenchus xylophilus*. That is, it was confirmed that the JCK-1398 10% SC formulation showed a control effect of 72.7% and thus can also control pine wilt disease very effectively in fields, like in the seedling assay.

Example 13: Control effects against various plant diseases

Based on the resistance-inducing effect of the *Bacillus subtilis* JCK-1398 strain, the control effects against various plant diseases were investigated using a spray-dried powder of a culture of the JCK-1398 strain for experiments for expanded application.

13-1. Control effect against bacterial spot (pathogen: *Xanthomonas* euvesicatoria)

To 500-fold and 5,000-fold diluted solutions of a spray-dried powder of the JCK-1398 strain prepared by the same method as in Example 8 were added the surfactant Tween® 20 (250 µg/ml), and then 8- to 9-leaf stage chili pepper plants (Hungnong Seed, Bultap chili pepper) were treated with the resultant solutions at 20 ml per pot by soil drenching and foliar spraying. Each sample was applied 4 days before inoculation with *Xanthomonas euvesicatoria* inoculum. As for a control group, the synthetic agrochemical pesticides Sungbocycline wettable powder (oxytetracycline, SUNGBO Chemicals) and Ilpum wettable powder (oxolinic acid 20% WP, Dongbang Agro) each were applied at a predetermined amount (1,000-fold diluted solution), and as for an untreated group, only Tween® 20 (250 µg/ml) was applied in the same manner without chemical agents.

Figure 11:
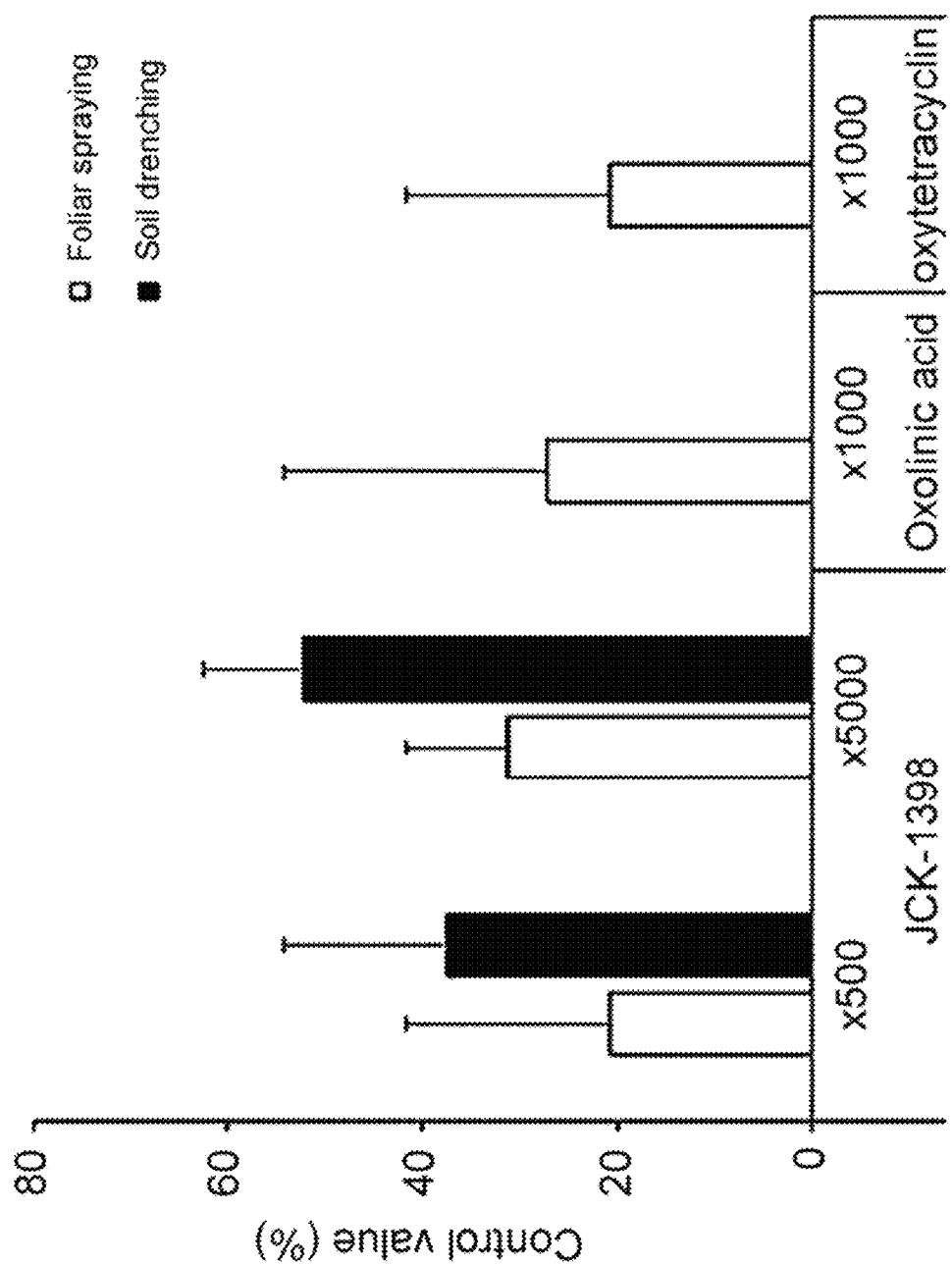
FIG. 11 confirms the bacterial spot control effect of a culture of the *Bacillus subtilis* JCK-1398 strain according to one example of the present invention.

Then, *Xanthomonas euvesicatoria* was subjected to static culture in TSA at 30° C. for about 48 hours, and then the cells were harvested using 2 ml of sterile water. The inoculum was prepared by diluting the harvested *Xanthomonas euvesicatoria* to an optical density value of 0.1 at 600 nm through a UV spectrometer. Each seedling was foliar-sprayed with 5 ml of the inoculum. The inoculated seedlings were placed in a growth room maintained at 25±2° C. and humidity of 95% for 3 days. Thereafter, the disease severity was observed with constant irrigation and foliar watering, and the results are shown in FIG. 11 and Table 18.

Each treatment was repeated three times, and each experiment was repeated twice. The disease severity was determined using an index of 0 to 6 according to Abbasi, and thus the severity of bacterial spot formed on chili pepper leaves was investigated. The criteria of the index for disease severity were as follows:

0=No disease

1=1-2 small spots on 1-2 leaves

2=Several spots on multiple leaves
3=Many spots agglomerated on leaf
4=Many spots agglomerated on many leaves
5=Severe disease and defoliation
6=Plant death

TABLE 18

|  | JCK-1398 X500 | | JCK-1398 X5000 | | Oxolinic acid | Oxytetracyclin |
|---|---|---|---|---|---|---|
| Treated group | Folia spraying | Soil drenching | Folia spraying | Soil drenching | Folia spraying | Soil drenching |
| Control value (%) | 20.8 | 37.5 | 31.3 | 52.1 | 27.1 | 20.8 |

As can be confirmed in FIG. 11 and Table 18, the 5,000-fold diluted solution of the spray-dried powder of the *Bacillus subtilis* JCK-1398 strain showed a control effect of 52.1% for soil drenching and a control effect of 31.3% for foliar spraying. In addition, the 500-fold diluted solution showed a control effect of 37.5% for soil drenching and a control effect of 20.8% for foliar spraying. Therefore, the treatment of chili pepper plants with cultures of the JCK-1398 strain is expected to be useful in the control of bacterial spot by effectively inducing resistance.

13-2. Control Effect Against Dollar Spot (Pathogen: *Sclerotinia Homoeocarpa*)

As for diluted solutions of a culture of JCK-1398, the JCK-1398 strain was cultured by the same method as in Example 4-1, and then a solution obtained by diluting the culture to an optical density value of 0.08 at 600 nm through a UV spectrometer was used as a 100-fold diluted solution, and a solution obtained by diluting the culture to an optical density value of 0.008 was used as a 1,000-fold diluted solution. JCK-1398 20% SC was prepared by using diluted solutions of a culture of JCK-1398, obtained by dilution to 100-fold and 1,000-fold with sterile water. As for an untreated group, a solution obtained by addition of Tween®-20 to 250 µg/ml was used, and as for a control group, Tebuconazole 25% EC (Horikuo emulsion) was used at a predetermined amount (2,000-fold diluted solution) and the half thereof (4,000-fold diluted solution).

Each sample was applied by soil drenching treatment 4 days before the inoculation with *Sclerotinia* homoeocarpa inoculum. The 100-fold and 1,000-fold diluted solutions of the culture of JCK-1398 were applied as single agents or applied as combination agents with a 4,000-fold diluted solution of Tebuconazole 25% EC. The 100-fold and 1,000-fold diluted solutions of the culture of JCK-1398 20% SC were applied as single agents, or applied as combination agents with a 4,000-fold diluted solution of Tebuconazole 25% EC.

Then, the flora of *Sclerotinia* homoeocarpa was torn off as an agar plug with a size of 2×2 mm in width and length, and seeded in PDA medium, and then cultured in a thermostat at 25° C. for 5 days. The flora of the strain cultured in a bran-chaff medium (9 g of bran, 1.5 g of rice husk, and 10 ml of distilled water) sterilized twice was cut into a size of 1×1 cm in width×length, followed by each transplantation of 5 pieces, and then the entrance was blocked with only a Bio-Sili stopper, followed by culture in a thermostat at 25° C. for 7 days. Then, the cultured cells were placed together with the medium in a grinder, and 110 ml and 1.1 ml of streptomycin sulfate (200 µg/ml) were added, followed by grinding.

Last, creeping bentgrass pots grown for about 1 month after sowing were punched to form a hole of about 1 cm in the centers thereof, and then the inoculation with the ground inoculum at 3.3 ml per pot was performed. The inoculated grass was observed at a humidity of 95% and a temperature of 25° C. until a difference between an untreated group and a treated group was seen. The disease severity was calculated by examining the diseased area compared with the total pot area, and three pots were experimented twice per treated group. The results are shown in FIG. 12 and Table 19.

TABLE 19

| Treated group | | Control value (%) |
|---|---|---|
| JCK-1398 culture X100 | Single agent | 16.16 |
| | Combination agent | 97.26 |
| JCK-1398 culture X1000 | Single agent | 0.00 |
| | Combination agent | 26.03 |
| JCK-1398 20% SC X100 | Single agent | 2.19 |
| | Combination agent | 84.93 |
| JCK-1398 20% SC X1000 | Single agent | 34.25 |
| | Combination agent | 73.97 |
| Tebuconazole 25% EC X2000 | Single agent | 78.08 |
| Tebuconazole 25% EC X4000 | Single agent | 41.10 |

Figure 12:
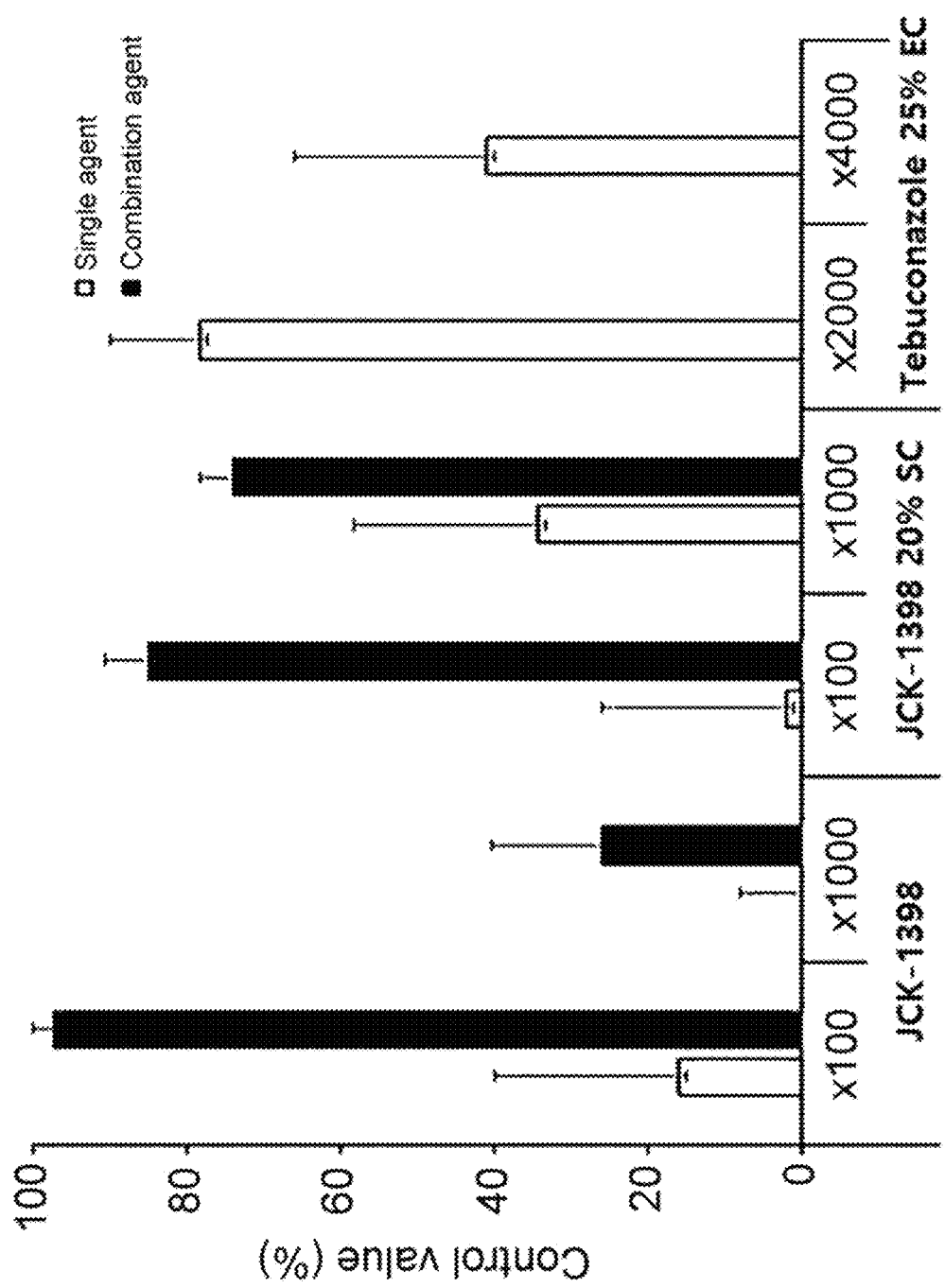
FIG. 12 confirms the dollar spot control effect of a culture of the *Bacillus subtilis* JCK-1398 strain according to one example of the present invention.

As can be confirmed in FIG. 12 and Table 19, the treatment with the JCK-1398 cultures (100-fold diluted solution and 1,000-fold diluted solution) and JCK-1398 20% SC (100-fold diluted solution) as single agents showed disease severity similar to those of an untreated group. However, the treatment with the combination agent of the JCK-1398 culture (100-fold diluted solution) and the 4,000-fold diluted solution of Tebuconazole 25% EC showed a control effect as high as 97.26%, and the treatment with the combination agents of the JCK-1398 20% SC (100-fold diluted solution and 1,000-fold diluted solution) and the 4,000-fold diluted solution of Tebuconazole 25% EC showed control effects of 84.93% and 73.97%, respectively, indicating a dose-dependent control effect. Therefore, the cultures of the JCK-1398 strain of the present invention are expected to significantly reduce the treatment amount of agrochemicals used in the control of dollar spot.

13-3. Control Effect Against *Aculops Lycopersici* (Pest)

JCK-1398 20% SC was prepared by using diluted solutions of a culture of JCK-1398, obtained by dilution to 250-fold, 500-fold, and 1,000-fold with sterile water. As for an untreated group, a solution obtained by addition of Tween®-20 at 250 µg/ml was used, and as for a control group, a Sunchungtan liquid (fosthiazate 30% SL, Farm-Hannong) was used at a predetermined amount (4,000-fold diluted solution).

The treatment with each sample was performed on 4- to 5-leaf stage *Lycopersicon esculentum* Mill at 20 ml per tree by soil drenching. JCK-1398 20% SC was applied twice at an interval of 3 days, and the Sunchungtan liquid was applied once. Then, Aculops *lycopersici* was naturally generated by maintaining appropriate temperature and humidity (25-28° C., 30%) for the generation thereof. Aculops *lycopersici* was generated 2 weeks after second chemical treatment. After 2 weeks of generation of Aculops *lycopersici*, the length of the aerial part was measured to investigate the control effect against Aculops *lycopersici*. The results are shown in FIG. 13 and Table 20.

TABLE 20

| Treated group | JCK-1398 20% SC | | | Fosthiazate 30% SL | Untreated group |
|---|---|---|---|---|---|
| | X250 | X500 | X1000 | X4000 | |
| Length (cm) | 26.13 | 21.75 | 15.88 | 32.00 | 16.83 |

Figure 13:
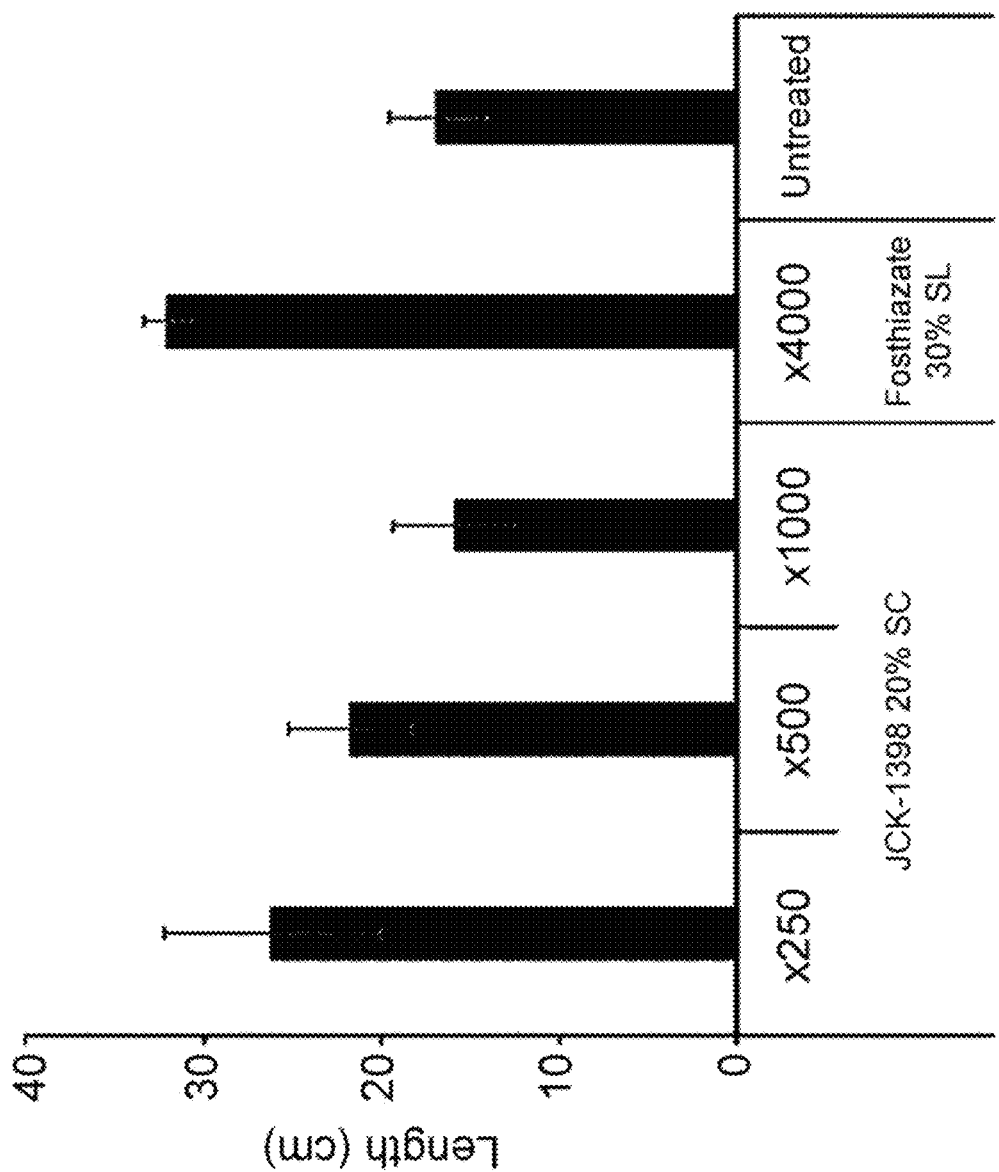
FIG. 13 confirms the Aculops *lycopersici* control effects of a *Bacillus subtilis* JCK-1398 strain 20% SC formulation according to one example of the present invention.

As can be confirmed in FIG. 13 and Table 20, the groups treated with the 250-fold, 500-fold, and 1,000-fold diluted solutions of JCK-1398 20% SC showed in 26.13 cm, 21.75 cm, and 15.88 cm in aerial part length, respectively, indicating that the more the concentration, the longer the aerial part. The 4,000-fold diluted solution of fosthiazate 30% SL used as the control group showed the largest aerial part length, 32 cm, and the untreated group showed the smallest aerial part length, 16.83 cm. Therefore, the treatment of the tomato tree with the cultures of the JCK-1398 strain is expected to be useful in the control of Aculops *lycopersici* by effectively inducing resistance.

INDUSTRIAL APPLICABILITY

The present invention relates to a *Bacillus subtilis* JCK-1398 strain inducing resistance in pine and various plants, and a composition and a method for controlling plant diseases by using the same.

[Accession Number]
    Depository institution name: Korean Collection for Type Cultures
    Accession number: KCTC14084BP
    Deposit date: 20191219

BUDAPEST TREATY ON THE INTERNATIONAL RECOGNITION OF THE DEPOSIT
OF MICROORGANISMS FOR THE PURPOSE OF PATENT PROCEDURE

INTERNATIONAL FORM

RECEIPT IN THE CASE OF AN ORIGINAL DEPOSIT issued pursuant to Rule 7.1

TO: Industry Foundation of Chonnam National University
Industry Foundation of Chonnam National University
77 Yongbong-ro, Buk-gu, Gwangju
Republic of Korea

| I. IDENTIFICATION OF THE MICROORGANISM | |
|---|---|
| Identification reference given by the DEPOSITOR: *Bacillus subtilis* JCK-1398 | Accession number given by the INTERNATIONAL DEPOSITARY AUTHORITY: KCTC 14084BP |

| II. SCIENTIFIC DESCRIPTION AND/OR PROPOSED TAXONOMIC DESIGNATION |
|---|
| The microorganism identified under I above was accompanied by: <br> [ ] a scientific description <br> [ ] a proposed taxonomic designation <br> (Mark with a cross where applicable) |

| III. RECEIPT AND ACCEPTANCE |
|---|
| This International Depositary Authority accepts the microorganism identified under I above, which was received by it on December 18, 2019. |

| IV. RECEIPT OF REQUEST FOR CONVERSION |
|---|
| The microorganism identified under I above was received by this International Depositary Authority on and a request to convert the original deposit to a deposit under the Budapest Treaty was received by it on |

| V. INTERNATIONAL DEPOSITARY AUTHORITY | |
|---|---|
| Name: Korean Collection for Type Cultures <br><br> Address: Korea Research Institute of Bioscience and Biotechnology (KRIBB) 181, Ipsin-gil, Jeongeup-si, Jeollabuk-do 56212 Republic of Korea | Signature(s) of persons(s) having the power to represent the International Depositary Authority or of authorized official(s): <br><br> *Song-Gun Kim* <br><br> KIM, Song-Gun, Director <br> Date: December 19, 2019 |

This application contains references to amino acid sequences and/or nucleic acid sequences which have been submitted concurrently herewith as the sequence listing text file entitled "000320usnp_SequenceListing.TXT", file size 7 kilobytes (KB), created on 12 Aug. 2022. The aforementioned sequence listing is hereby incorporated by reference in its entirety pursuant to 37 C.F.R. § 1.52 (e) (5).

What is claimed is:

1. A pesticidal composition or an antibiotic composition comprising an effective amount of at least one selected from the group consisting of the *Bacillus subtilis* JCK-1398 strain having the accession number KCTC 14084BP, a culture of the strain, a concentrate of the culture, a dried product of the culture, and a culture supernatant of the strain; and
   at least one resistance elicitor selected from the group consisting of acibenzolar-S-methyl and methyl salicylate, and
   wherein the composition exhibits antibacterial activity against at least one selected from the group consisting of *Xanthomonas euvesicatoria* and *Sclerotinia homoeocarpa*.

2. A composition for controlling a plant disease or pest, the composition comprising an effective amount of a culture of the *Bacillus subtilis* JCK-1398 strain having the accession number KCTC 14084BP; and
   at least one resistance elicitor selected from the group consisting of acibenzolar-S-methyl and methyl salicylate.

3. The composition of claim 2, wherein the plant disease is selected from the group consisting of pine will disease, bacterial spot, and dollar spot; and the pest is *Aculops lycopersici*.

4. The composition of claim 2, wherein the composition is used as a combination agent with a synthetic agrochemical.

5. The composition of claim 4, wherein the synthetic agrochemical is tebuconazole.

* * * * *

SEQUENCE LISTING

<160> NUMBER OF SEQ ID NOS: 33

<210> SEQ ID NO 1
<211> LENGTH: 20
<212> TYPE: DNA
<213> ORGANISM: Artificial Sequence
<220> FEATURE:
<223> OTHER INFORMATION: PR-1b family For

<400> SEQUENCE: 1
tgccccttca ggtaaatcgt					20

<210> SEQ ID NO 2
<211> LENGTH: 21
<212> TYPE: DNA
<213> ORGANISM: Artificial Sequence
<220> FEATURE:
<223> OTHER INFORMATION: PR-1b family Rev

<400> SEQUENCE: 2
gcgggtcgta gttgcagata a					21

<210> SEQ ID NO 3
<211> LENGTH: 20
<212> TYPE: DNA
<213> ORGANISM: Artificial Sequence
<220> FEATURE:
<223> OTHER INFORMATION: PR-2 family For

<400> SEQUENCE: 3
cgacaacatt cgccccttct					20

<210> SEQ ID NO 4
<211> LENGTH: 20
<212> TYPE: DNA
<213> ORGANISM: Artificial Sequence
<220> FEATURE:
<223> OTHER INFORMATION: PR-2 family Rev

<400> SEQUENCE: 4
ctgcagcgcg gtttgaatat					20

<210> SEQ ID NO 5
<211> LENGTH: 19
<212> TYPE: DNA
<213> ORGANISM: Artificial Sequence
<220> FEATURE:
<223> OTHER INFORMATION: PR-3 family class 1 For

<400> SEQUENCE: 5
acctacagcg cttcattgc					19

<210> SEQ ID NO 6
<211> LENGTH: 20
<212> TYPE: DNA
<213> ORGANISM: Artificial Sequence
<220> FEATURE:
<223> OTHER INFORMATION: PR-3 family class 1 Rev

```
<400> SEQUENCE: 6
tgtggtttca tgcgacgttt                                              20

<210> SEQ ID NO 7
<211> LENGTH: 21
<212> TYPE: DNA
<213> ORGANISM: Artificial Sequence
<220> FEATURE:
<223> OTHER INFORMATION: PR-3 family class 4 For

<400> SEQUENCE: 7
ccatcgaagc ccaggtaatt t                                            21

<210> SEQ ID NO 8
<211> LENGTH: 22
<212> TYPE: DNA
<213> ORGANISM: Artificial Sequence
<220> FEATURE:
<223> OTHER INFORMATION: PR-3 family class 4 Rev

<400> SEQUENCE: 8
agccgggaag caatattatg gt                                           22

<210> SEQ ID NO 9
<211> LENGTH: 21
<212> TYPE: DNA
<213> ORGANISM: Artificial Sequence
<220> FEATURE:
<223> OTHER INFORMATION: PR-4 family For

<400> SEQUENCE: 9
ccccgttact gtcaattgca t                                            21

<210> SEQ ID NO 10
<211> LENGTH: 20
<212> TYPE: DNA
<213> ORGANISM: Artificial Sequence
<220> FEATURE:
<223> OTHER INFORMATION: PR-4 family Rev

<400> SEQUENCE: 10
aaagcgtgac ggtgcgtatt                                              20

<210> SEQ ID NO 11
<211> LENGTH: 23
<212> TYPE: DNA
<213> ORGANISM: Artificial Sequence
<220> FEATURE:
<223> OTHER INFORMATION: PR-5 family For

<400> SEQUENCE: 11
gaaccagtgc ccatacacag tct                                          23

<210> SEQ ID NO 12
<211> LENGTH: 21
<212> TYPE: DNA
<213> ORGANISM: Artificial Sequence
<220> FEATURE:
<223> OTHER INFORMATION: PR-5 family Rev

<400> SEQUENCE: 12
cctgcggcaa cgttaaaagt c                                            21

<210> SEQ ID NO 13
<211> LENGTH: 20
```

```
<212> TYPE: DNA
<213> ORGANISM: Artificial Sequence
<220> FEATURE:
<223> OTHER INFORMATION: PR-9 family For

<400> SEQUENCE: 13
acaccaccgt gctggacatt                                                    20

<210> SEQ ID NO 14
<211> LENGTH: 20
<212> TYPE: DNA
<213> ORGANISM: Artificial Sequence
<220> FEATURE:
<223> OTHER INFORMATION: PR-9 family Rev

<400> SEQUENCE: 14
gtgcgggagt cggtgtagag                                                    20

<210> SEQ ID NO 15
<211> LENGTH: 21
<212> TYPE: DNA
<213> ORGANISM: Artificial Sequence
<220> FEATURE:
<223> OTHER INFORMATION: PR-10 family For

<400> SEQUENCE: 15
tgtctcaagt ggaggcaagg a                                                  21

<210> SEQ ID NO 16
<211> LENGTH: 22
<212> TYPE: DNA
<213> ORGANISM: Artificial Sequence
<220> FEATURE:
<223> OTHER INFORMATION: PR-10 family Rev

<400> SEQUENCE: 16
aagcgacaat ttcaggcaaa ac                                                 22

<210> SEQ ID NO 17
<211> LENGTH: 20
<212> TYPE: DNA
<213> ORGANISM: Artificial Sequence
<220> FEATURE:
<223> OTHER INFORMATION: Antimicrobial peptide For

<400> SEQUENCE: 17
gcgttgctca tacccgtttt                                                    20

<210> SEQ ID NO 18
<211> LENGTH: 22
<212> TYPE: DNA
<213> ORGANISM: Artificial Sequence
<220> FEATURE:
<223> OTHER INFORMATION: Antimicrobial peptide Rev

<400> SEQUENCE: 18
gcagcactta gcactggatg aa                                                 22

<210> SEQ ID NO 19
<211> LENGTH: 20
<212> TYPE: DNA
<213> ORGANISM: Artificial Sequence
<220> FEATURE:
<223> OTHER INFORMATION: Cytochrome P450 For

<400> SEQUENCE: 19
```
aacatgtcct gcagcacgaa                                           20

<210> SEQ ID NO 20
<211> LENGTH: 20
<212> TYPE: DNA
<213> ORGANISM: Artificial Sequence
<220> FEATURE:
<223> OTHER INFORMATION: Cytochrome P450 Rev

<400> SEQUENCE: 20
gtgcaccgca agtaaaccaa                                           20

<210> SEQ ID NO 21
<211> LENGTH: 22
<212> TYPE: DNA
<213> ORGANISM: Artificial Sequence
<220> FEATURE:
<223> OTHER INFORMATION: Extensin For

<400> SEQUENCE: 21
cgaatgtaat tccgaagttg ca                                        22

<210> SEQ ID NO 22
<211> LENGTH: 20
<212> TYPE: DNA
<213> ORGANISM: Artificial Sequence
<220> FEATURE:
<223> OTHER INFORMATION: Extensin Rev

<400> SEQUENCE: 22
ccatcccaaa ccaccagtct                                           20

<210> SEQ ID NO 23
<211> LENGTH: 23
<212> TYPE: DNA
<213> ORGANISM: Artificial Sequence
<220> FEATURE:
<223> OTHER INFORMATION: Hydroxyproline-rich glycoprotein precursor For

<400> SEQUENCE: 23
gagaaactgg caccgtctta gga                                       23

<210> SEQ ID NO 24
<211> LENGTH: 20
<212> TYPE: DNA
<213> ORGANISM: Artificial Sequence
<220> FEATURE:
<223> OTHER INFORMATION: Hydroxyproline-rich glycoprotein precursor Rev

<400> SEQUENCE: 24
acctccccct ccatctcaca                                           20

<210> SEQ ID NO 25
<211> LENGTH: 20
<212> TYPE: DNA
<213> ORGANISM: Artificial Sequence
<220> FEATURE:
<223> OTHER INFORMATION: Metallothionein-like protein For

<400> SEQUENCE: 25
tcaggctgct gcgttatttg                                           20

<210> SEQ ID NO 26
<211> LENGTH: 21
<212> TYPE: DNA
<213> ORGANISM: Artificial Sequence

```
<220> FEATURE:
<223> OTHER INFORMATION: Metallothionein-like protein Rev

<400> SEQUENCE: 26
tgtcagcgca gtcacaattt g                                                    21

<210> SEQ ID NO 27
<211> LENGTH: 19
<212> TYPE: DNA
<213> ORGANISM: Artificial Sequence
<220> FEATURE:
<223> OTHER INFORMATION: Xyloglucan endotransglycosylase For

<400> SEQUENCE: 27
tctgcgcccc tactttttcc                                                      19

<210> SEQ ID NO 28
<211> LENGTH: 20
<212> TYPE: DNA
<213> ORGANISM: Artificial Sequence
<220> FEATURE:
<223> OTHER INFORMATION: Xyloglucan endotransglycosylase Rev

<400> SEQUENCE: 28
agctgggcga ttgatcatgt                                                      20

<210> SEQ ID NO 29
<211> LENGTH: 20
<212> TYPE: DNA
<213> ORGANISM: Artificial Sequence
<220> FEATURE:
<223> OTHER INFORMATION: Elongation factor-1 alpha For

<400> SEQUENCE: 29
gggaagccac ccaaagtttt                                                      20

<210> SEQ ID NO 30
<211> LENGTH: 20
<212> TYPE: DNA
<213> ORGANISM: Artificial Sequence
<220> FEATURE:
<223> OTHER INFORMATION: Elongation factor-1 alpha Rev

<400> SEQUENCE: 30
tacatgggaa gacgccgaat                                                      20

<210> SEQ ID NO 31
<211> LENGTH: 24
<212> TYPE: DNA
<213> ORGANISM: Artificial Sequence
<220> FEATURE:
<223> OTHER INFORMATION: gyrA For

<400> SEQUENCE: 31
cagtcaggaa atgcgtacgt cctt                                                 24

<210> SEQ ID NO 32
<211> LENGTH: 24
<212> TYPE: DNA
<213> ORGANISM: Artificial Sequence
<220> FEATURE:
<223> OTHER INFORMATION: gyrA Rev

<400> SEQUENCE: 32
caaggtaatg ctccaggcat tgct                                                 24
```

```
<210> SEQ ID NO 33
<211> LENGTH: 856
<212> TYPE: DNA
<213> ORGANISM: Artificial Sequence
<220> FEATURE:
<223> OTHER INFORMATION: Bacillus subtilis JCK-1398 strain gyrA sequence

<400> SEQUENCE: 33
gatgtttgta gagcagtttg tttgtacaga ttgtttaaga tgacattcgc attggcatcg      60
cgtctgattt caatgacaat tctcatacct gtacgatctg actcatcacg cagatctgtg     120
ataccctcta tcttttgtc ccttacgaga tcagcaattt tctcaattaa tttcgcctta     180
tttacttggt aaggtaactc tgtaacgata attctttctt tacccgaaga tgtttgttcg     240
atctcagctt ttgcccggat cgtgatagag cctcggcctg attcgtatgc tttccggata    300
ccgctgcggc ccaagatttg acccgcagtc gggaaatcag gtcctggaat gacttccata    360
agctctggaa tggtaatgtc cggattctca ctgacagcaa gtactccgtc aatgatttct    420
cccagctggt gcggaggaat gtttgttgcc atacctaccg caatgccggc agcaccgttc    480
acgagcagat tcgggaacct tgaaggcata acgacaggtt ctctttctga cccgtcatag    540
ttatcctggt aatcgattgt gtcttttgtg atgtcacgaa gaatctccat tgagatttta    600
gacattcttg cttctgtata acgcatggcc gccgctgagt ctccgtcaac agaaccgaag    660
tttccgtgac cgtcaacgag catataacgg tagttgaaat cctgagccat tctgaccatg    720
gattcatata ccgctgaatc accgtgcggg tggtatttcc cgataacttc tccaacgata    780
cgcgcggatt ttttataagg cttgtcactt gtcatgccta aatcattcat tgcatacaaa    840
atccgtctat gaactg                                                     856
```